(12) United States Patent
Makiyama et al.

(10) Patent No.: US 7,340,102 B2
(45) Date of Patent: Mar. 4, 2008

(54) DECODING APPARATUS USING TOOL INFORMATION FOR CONSTRUCTING A DECODING ALGORITHM

(75) Inventors: Takeshi Makiyama, Higashihiroshima (JP); Seiji Sato, Toride (JP); Noritaka Koizumi, Chiba (JP); Tadashi Uchiumi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/635,676

(22) Filed: Dec. 8, 2006

(65) Prior Publication Data

US 2007/0081732 A1 Apr. 12, 2007

Related U.S. Application Data

(60) Continuation of application No. 10/728,866, filed on Dec. 8, 2003, now Pat. No. 7,194,136, which is a division of application No. 09/407,880, filed on Sep. 29, 1999, now Pat. No. 6,687,409, which is a division of application No. 08/727,787, filed on Oct. 8, 1996, now Pat. No. 5,987,181.

(30) Foreign Application Priority Data

| Oct. 12, 1995 | (JP) | .................................. 7-264127 |
| Oct. 25, 1995 | (JP) | .................................. 7-277463 |
| Nov. 28, 1995 | (JP) | .................................. 7-308915 |
| Nov. 29, 1995 | (JP) | .................................. 7-310667 |

(51) Int. Cl.
*G06K 9/36* (2006.01)

(52) U.S. Cl. .................................................. 382/239

(58) Field of Classification Search ........ 382/232–233, 382/236, 239–240, 248, 103, 250–251; 375/240.01–240.26
See application file for complete search history.

(56) References Cited

U.S. PATENT DOCUMENTS 5,111,294 A 5/1992 Asai et al.

(Continued)

FOREIGN PATENT DOCUMENTS

EP 0577337 1/1994

(Continued)

OTHER PUBLICATIONS

"Information Technology—Generic Coding of Moving Pictures and Associated Audio Information: Video," ISO/IEC 13818-2: 1995 [E], pp. 29-44, and "Difference Between Present Application (U.S. Appl. No.09/407,880) and ISO/IEC 13818-2."

*Primary Examiner*—Ishrat Sherali
(74) *Attorney, Agent, or Firm*—Birch, Stewart, Kolasch & Birch, LLP

(57) ABSTRACT

A coding and decoding apparatus is constructed so that the coding side transmits coded data together with identifying information for identifying the device of decoding the coded data, and the decoding side is capable of storing a number of decoding schemes so as to perform decoding based on one of the previously stored schemes. The apparatus further has devices for storing the received tools and tool-correspondent information which numerically represents the capacities of the tools so that it can make a comparison between the decoding capacity and the processing capacities of the tools to determine the possibility of the operations of the received tools. Further, a set of the tools are hierarchized so that the coded data produced by the n-ranked tool can be decoded by the (n+1)-ranked tool. Alternatively, the tools are defined in a hierarchical manner so that the decoding tools installed in the decoding apparatus will be able to assure the minimum quality and the requested decoding process can be performed by the received decoding tool. Further, the identification code of the decoding scheme used can be transmitted as required so that the decoding scheme can be expanded by transmitting the differential information from the basic decoding scheme.

6 Claims, 27 Drawing Sheets

U.S. PATENT DOCUMENTS

| | | |
|---|---|---|
| 5,138,459 A | 8/1992 | Roberts et al. |
| 5,198,900 A | 3/1993 | Tsukagoshi et al. |
| 5,235,419 A | 8/1993 | Krause |
| 5,260,783 A | 11/1993 | Dixit |
| 5,371,734 A | 12/1994 | Fischer |
| 5,376,968 A * | 12/1994 | Wu et al. ............... 375/240.14 |
| 5,398,277 A | 3/1995 | Martin, Jr. et al. |
| 5,502,497 A | 3/1996 | Yamaashi et al. |
| 5,521,717 A | 5/1996 | Maeda et al. |
| 5,598,483 A * | 1/1997 | Purcell et al. ............... 382/232 |
| 5,619,438 A | 4/1997 | Farley et al. |
| 5,640,198 A | 6/1997 | Makiyama et al. |
| 5,689,346 A | 11/1997 | Noda et al. |
| 5,692,012 A | 11/1997 | Virtamo et al. |
| 5,802,315 A | 9/1998 | Uchiumi et al. |
| 5,881,244 A | 3/1999 | Uchiumi et al. |
| 5,987,181 A | 11/1999 | Makiyama et al. |
| 6,310,981 B1 | 10/2001 | Makiyama et al. |
| 6,636,970 B2 | 10/2003 | Akiyama et al. |
| 6,681,050 B1 | 1/2004 | Makiyama et al. |

FOREIGN PATENT DOCUMENTS

| | | |
|---|---|---|
| JP | 04-008064 | 1/1992 |
| JP | 5-316369 | 11/1993 |
| WO | WO-96/02895 | 2/1996 |

\* cited by examiner

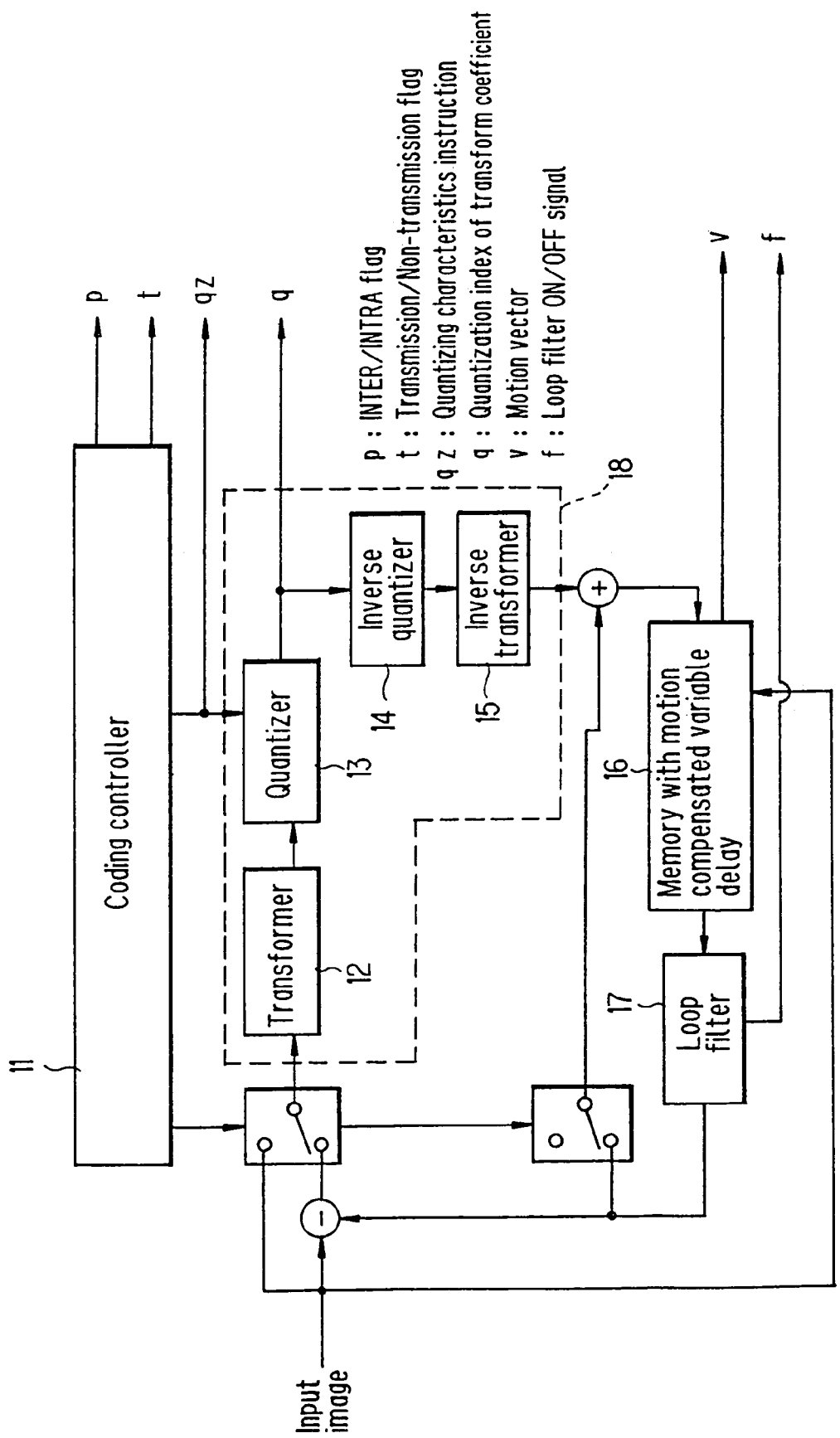

Sampling per 1/4 pixel

Sampling per 1/2 pixel

Sampling per 1 pixel (Pattern TA before movement)　　(Pattern TA after movement)

(Pattern TA before movement)　　(Pattern TA after movement)

(Pattern TA before movement)　　(Pattern TA after movement)

C a : Coding capacity of tool 'a'
C b : Coding capacity of tool 'b'
C z : Sum of capacities other than Ca or Cb which constitute algorithm
C r : Decoding capacity of decoder

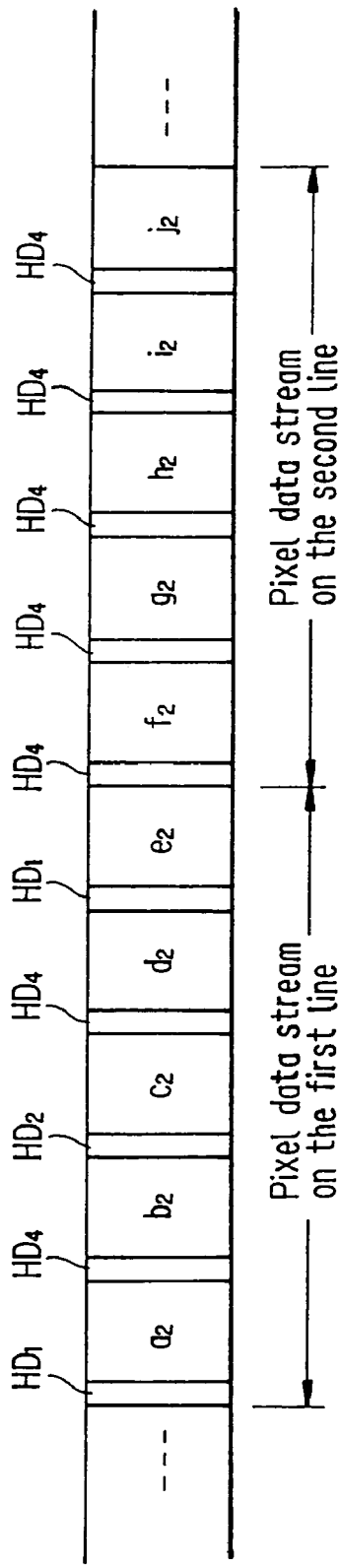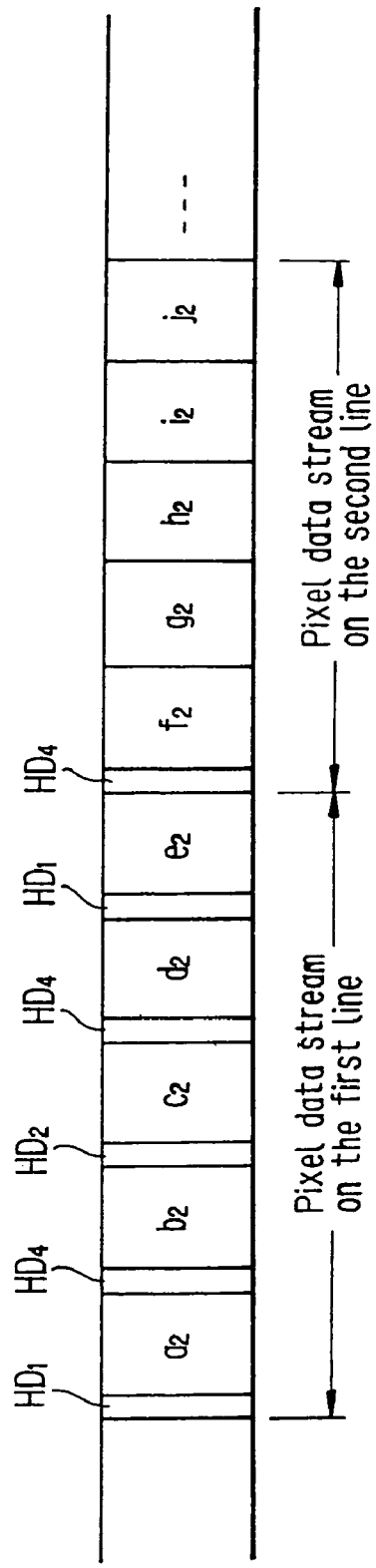

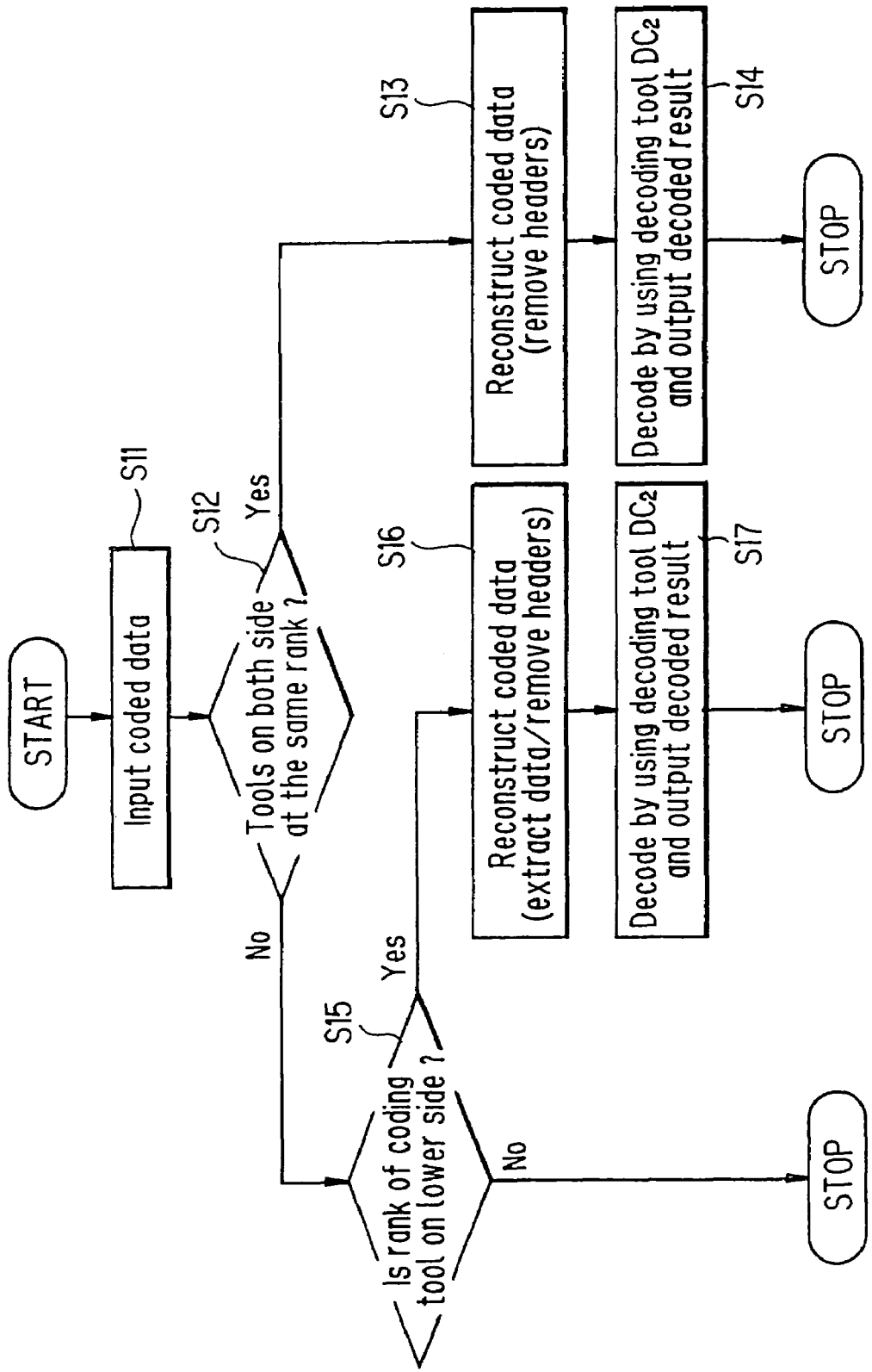

DECODING APPARATUS USING TOOL INFORMATION FOR CONSTRUCTING A DECODING ALGORITHM

This application is a Continuation of U.S. patent application Ser. No. 10/728,866, filed on Dec. 8, 2003, and issued as U.S. Pat. No. 7,194,136 on Mar. 20, 2007 which is a Divisional of U.S. patent application Ser. No. 09/407,880, filed on Sep. 29, 1999, and issued as U.S. Pat. No. 6,687,409 on Feb. 3, 2004 which is a Divisional of prior U.S. patent application Ser. No. 08/727,787, filed on Oct. 8, 1996 and issued as U.S. Pat. No. 5,987,181 on Nov. 16, 1999, the entire contents of which are hereby incorporated by reference and for which priority is claimed under 35 U.S.C. § 120; and this application claims priority of Application Nos. 7-264127 filed in Japan on Oct. 12, 1995; 7-277463 filed in Japan on Oct. 25, 1995; 7-308915 filed in Japan on Nov. 28, 1995; and 7-310667 filed in Japan on Nov. 29, 1995 under 35 U.S.C. § 119.

BACKGROUND OF THE INVENTION (1) Field of the Invention

The present invention relates to a coding and decoding apparatus for coding information such as an image signal etc. to transmit it and decoding the coded data. More detailedly, the present invention relates to a coding and decoding apparatus which enables communication between coding and decoding tools having different processing capacities and in which the coding apparatus transmits not only the coded data but also coding information for the construction of a decoding scheme as the means of decoding the coded data and the decoding apparatus receives the coding information together with coded data and reconstructs the decoding scheme based on the coding information so as to decode the received coded data. Further, the present invention is directed to a coding and decoding technology for performing the communication in a coding and decoding apparatus between the transmitting and receiving devices having different capacities in the case where an algorithm includes various coding and decoding tools such as near-future image coding schemes represented by the MPEG4 etc., and more particularly relates to a coding and decoding apparatus which enables simultaneous transmission of coded data and tool information for constructing the algorithm for decoding the coded data in order to realize a hierarchical coding and decoding operation.

(2) Description of the Background Art

In recent years, a wide spread of ISDN (Integrated Services Digital Network) has realized image communication services as a new communication service. Examples of the services include the video phone and video conference system, etc. On the other hand, the development of the mobile communication networks represented by the PHS and the FPLMTS, accelerates demands for further improvement and variations of the services and portability of the devices.

In general, in the case where image information as in the video phone or video conference system is transmitted, the amount of image information is very large. However, due to the line speed used for the transmission and the cost problem, the image information to be transmitted needs to be compressed and coded so that the amount of information can be reduced.

As to the coding schemes for compressing image information, JPEG (Joint Photographic coding Experts Group) has already been standardized internationally for a still image coding system, H.261 for a motion picture coding scheme, and MPEG1(Moving Picture Coding Experts Group)and MPEG2 for motion picture coding schemes. Further, MPEG4 is now being standardized as a coding scheme of very low-bit rate of 64 kbps or below.

In the current coding schemes such as JPEG, H.261, MPEG1, MPEG2, coding is performed following the specified algorithm. However, the MPEG4 is planned to flexibly deal with various applications and encode each of the applications in its optimal scheme. For this purpose the MPEG4 needs to have many tools (such as transformer, quantizer, inverse transformer, inverse quantizer, etc.) for its coder so that a suitable combination of them will be selected to perform coding.

FIG. 1A is a conceptual view showing the structure of a coding data stream which is formed by coding (compressing) image data based on the H.261 scheme. Each piece of the coded data such as motion vector information, DCT-coefficient, quantization step, etc., shown in FIG. 1A is image data which has been coded (compressed) based on a fixed coding algorithm in the coder, while the decoder has a decoding algorithm fixed corresponding to the coding algorithm so that the received pieces of the coded data will be decoded.

FIG. 1B is a conceptual view showing the structure of a coding data stream which is formed by coding (compressing) image data based on a coding scheme such as MPEG4 etc. whose algorithm is flexible. The coding data stream as shown in FIG. 1B is composed of coded (compressed) image data such as motion vector information 2, transform coefficient 4, motion vector information 6, transform coefficient 8 and quantization step 10 etc., and tool information such as motion compensation tool 1, inverse transform tool 3, motion compensation tool 5, inverse transform tool 7 and quantizing tool 9, etc., for decoding respective image data. FIG. 1B illustrates the details of the motion vector information, DCT-coefficient and quantization step at the leading end of the coding data stream of FIG. 1A. In this case, each piece of the tool information such as motion compensation 1 etc., is allowed to be selected from a number of types of the tool information so that it is possible to freely select a desired combination of the tool information. Accordingly, the coder transmits the tool information which has been used for coding as well as the image data to the decoder. The decoder, upon the decoding of the image data received, will decode the coded image data using the tool information transmitted from the coder.

FIG. 1C is a block diagram showing an example of a conventional coding and decoding apparatus based on H.261. This coding and decoding apparatus is composed of a controller 6a for controlling the entire apparatus, a coder 7a for coding based on H.261, and a decoder 8a for decoding the information which has been coded based on H.261, and a tool storage section 9a consisting of memories for storing tool information.

These coding and decoding processes can be realized by a dedicated hardware device with software installed therein or by an appropriate program executed in a general-purpose processor with a compiler.

First, description will be made of a method using a dedicated hardware device with software installed therein. FIG. 2 is a block diagram showing the configuration of coder 7a of FIG. 1C for yielding the coded data shown in FIG. 1A, based on H.261. In FIG. 2, the coder is composed of: a coding controller 11 for the control of coding; a transformer 12 for performing the DCT; a quantizer 13 for quantizing the coefficients transformed by transformer 12; an inverse quantizer 14 for performing inverse quantization of the coefficients quantized in quantizer 13; an inverse transformer 15 for performing the inverse DCT; a memory 16; and a loop filter 17. Here, memory 16 has the function of causing a variable delay for motion compensation, used when the inter-frame prediction for motion compensation is performed. Filter 17 is the loop filter capable of performing the on/off operation for each of macro blocks.

When the coding algorithm for generating the coding data stream shown in FIG. 1A is executed by the dedicated hardware device with software, the tool functions constituting the algorithm are carried out by software and the dedicated hardware components as shown in FIG. 2, namely, coding controller 11, transformer 12, quantizer 13, inverse quantizer 14, inverse transformer 15, memory 16 having the function of causing a variable delay for motion compensation, and loop filter 17. FIG. 3 is a block diagram showing the configuration of decoder 8a shown in FIG. 1C for decoding the coded data based on H.261. This decoder commonly has the constituents of the coder shown in FIG. 2, and the same components as those in the coder of FIG. 2 are designated at the same reference numerals. Specifically, in FIG. 3, a reference numerals 14 designates an inverse quantizer, 15 an inverse transformer, 16 a memory having the function of causing a variable delay for motion compensation, and 17 a loop filter.

The coded data by the coder shown in FIG. 2 is inverse quantized by inverse quantizer 14, and the signal is then made to undergo the inverse DCT in inverse transformer 15. Here, memory 16 and loop filter 17 are used when the motion compensated prediction coding data is decoded.

When several kinds of algorithms need to be processed using the scheme which performs the coding operation based on a fixed algorithm such as H.261 etc. as stated above, an individual hardware device with software is needed to execute each of the algorithms. FIG. 4 is block diagram showing the structure of a coder which codes the signal of a motion picture based on H.261 and the signal of a still image based on JPEG. For example, when a motion picture is coded based on H.261 and a still image is coded based on JPEG, the coder should have the configuration as shown in FIG. 4, which includes two individual coders, namely a H.261 coder 20 and a JPEG coder 21. In FIG. 4, H.261 coder 20 and JPEG coder 21 receive the motion picture data and the still image data respectively to output coded data of compressed data.

When the algorithm for generating the coded data shown in FIG. 1B is executed by a dedicated hardware device with software, a coder for executing this algorithm is realized by the one shown in FIG. 2 in which the circuit block designated at 18 is configured by the configuration shown in FIG. 5. In this case, the coder has plural types for each of the tools, or, transformer 12, quantizer 13, inverse quantizer 14, and inverse transformer 15. In this configuration, one desired type is selected for each of the tools (one type from transformer tools A to X, one type from quantizer tools A to X, one type from inverse quantizer tools A to X and one type from inverse transformer tools A to X) to perform a coding process.

The decoder for decoding the coding data stream shown in FIG. 1B is realized in a decoder shown in FIG. 3 in which the circuit block designated at 19 is replaced by a circuit block 22 in FIG. 5. In this case, the decoder has plural types for each of the tools, or, inverse quantizer 14, and inverse transformer 15. In this configuration, one desired type is selected fore ach of the tools (one type from inverse quantizer tools A to X and one type from inverse transformer tools A to X) to perform a decoding process.

In this decoding process, each piece of the tool information shown in FIG. 1B, for motion compensation tool 1, inverse transforming tool 3, motion compensation tool 5, inverse transforming tool 7 and quantizing tool 9 is sent to a controller 23, and each piece of the image data, which follows the corresponding tool information, specifically, of motion vector information 2, transform coefficient 4, motion vector information 6 and transform coefficient 8, is sent to the corresponding tools where each image data is processed. At the time, controller 23 selects one of the tools (one from inverse quantizing tools A to X and one from inverse transforming tools A to X shown in FIG. 5) based on the corresponding tool information in this way, each piece of the image data is processed through the tool selected by controller 23 and is decoded.

However, this method needs a dedicated device with software for each of the tools, thus the scale of the decoder tends to become large. To make matters worse, if the decoder receives the data which has been processed by a tool that is not provided for the decoder, it is impossible to decode the data itself. To solve this problem, a way that can be considered is one in which parts received should be compiled to prepare a processing program and the data should be decoded by a general-purpose processor.

Next, description will be made of a method of achieving the decoding process by executing a suitable program using a general-purpose processor with a compiler. Now, referring to FIG. 6, description will be made of a case where the coding data stream having the structure shown in FIG. 1B is decoded. FIG. 6 is a block diagram showing the structure of a decoder composed of a general-purpose processor 24 and a compiler 25. When all the tool information as shown in FIG. 1B, which includes a motion compensation tool 1, inverse transforming tool 3, motion compensation tool 5, inverse transforming tool 7 and quantizing tool 9, etc., is given to compiler 25, the compiler will prepare a processing program for controlling the operation of general-purpose processor 24. Each piece of the image data, which follows the corresponding tool information, specifically, motion vector information 2, transform coefficient 4, motion vector information 6, transform coefficient 8, quantization step 10, is given to general-purpose processor 24. Then, general-purpose processor 24 processes, with the processing program prepared by the compiler 25, the coded image data following the tool information so as to decode it for producing its decoded data.

In the case where the capacity of the decoding apparatus for processing a certain algorithm is lower than the total processing capacity for all the tools constituting the algorithm requested by the coder side, even if the tools transmitted from the coder is stored at the decoder side, the received data cannot be decoded exactly due to the inferior processing capacity of the decoder side. Thus the memory in the tool storage is also used just in vain.

Also in the conventional coding and decoding apparatus, when the tools which were used in the coder side are compared to the tools which are stored at the decoder side, the tools themselves should be compared to each other; this process required a very long period of time.

In the case where a new algorithm is used to decode the coded information, even if the tools for the algorithm are equivalent to those which have been previously stored, the decoder should receive the tools once again; this process also considerably lengthened the transmission/reception time.

In this way, when a video signal etc. is coded, the coding tools having suitable coding capacities to the quality of the reproduction image required by the decoder side, are selected to perform the coding operation. When the thus obtained coded data is decoded, it is necessary that the decoder should use decoding tools having decoding capacities (i.e. processing capacities) which correspond to the coding capacities (i.e. processing capacities) for the coding tools which were used for the coding operation. Processing capacity indicates a resource that is necessary for coding, decoding or both. For example, coding capacity may be expressed as processing capacity for coding. If these tools on the decoder side do not have the processing capacities for the tools on the coder side, the coded data cannot be decoded, thus making it impossible to establish the communication.

An example of the algorithm for the frame predictive coding will hereinbelow be described. Frame predictive coding shall mean inter-frame predictive coding, intra-frame predictive coding, or both as the context requires. Inter-frame predictive coding refers to any technique for data compression in which a subsequent frame, or a portion thereof, is encoded as differential data with respect to an earlier reference frame. Pixel data may be expressed as such differential data if inter-frame predictive coding is used. Illustratively, description will be made of the influence on the communication when the processing capacities for the frame predictive coding tools are not in agreement with those for the frame predictive decoding tools. The frame predictive coding may be considered as improving the quality of a display image on the decoder side since inter-frame predictive coding is an image data processing technology. Based on the data of the pixels directly obtained by sampling the video signal on the coder side, the pixel data for the display pixels on the decoder side are defined more minutely than the sampling pixels of the coder side since the pixels on the decoder side are predictively interpolated.

FIGS. 7A through 7C are conceptual diagrams for illustrating pixel data arrangements resulting from frame predictive coding. FIGS. 7A, 7B and 7C show the arrangements of pixel data ($a_1$, to $d_1$, $a_2$ to $i_2$, $a_4$ to $Y_4$) produced based on the image data A to D which is directly obtained by coding the video signal inputted from a visual sensor such as a camera etc., by means of the frame predictive coding tools of sampling the data per single pixel, per ½ pixel and per ¼ pixel, respectively. This pixel data is transmitted as the coded data obtained by the frame predictive coding, from the coder side to the decoder side. Here, in each of the frame predictive coding tools, the arithmetic operation for each piece of the pixel data is made based on the calculating formulae shown in Table 1.

TABLE 1

| Operation formula | Pixel data based on the sampling per ½ pixel | Pixel data based on the sampling per ¼ pixel |
| --- | --- | --- |
| A | $a_2$ | $a_4$ |
| B | $c_2$ | $e_4$ |
| C | $g_2$ | $u_4$ |
| D | $i_2$ | $y_4$ |
| (A + B)/2 | $b_2$ | $b_4, c_4, d_4$ |
| (A + C)/2 | $d_2$ | $f_4, k_4, p_4$ |
| (B + D)/2 | $f_2$ | $j_4, o_4, t_4$ |
| (C + D)/2 | $h_1$ | $v_4, w_4, x_4$ |
| (A + B + C + D)/4 | $e_2$ | $g_4, h_4, i_4, l_4,$ $m_4, n_4, q_4, r_4, s_4$ |

In FIG. 7A, pixel data $a_1$ to $d_1$, for the pixels indicated by '+' is the pixel data (corresponding to the (n+1)-ranked coded data when the pixel data obtained by the aftermentioned frame predictive coding tool of sampling per ½ pixel is assumed as the n-ranked coded data) produced by the frame predictive coding tool (corresponding to the (n+1)-ranked coding tool when the aftermentioned frame predictive coding tool of sampling per ½ pixel is assumed as the n-ranked coding tool) of sampling per single pixel. In this case, pixel data $a_1$, to $d_1$ obtained by the frame predictive coding is equivalent to image data A to D which is directly obtained by coding the video signal.

In FIG. 7B, pixel data $a_2$ to $i_2$ for the pixels indicated by '+' and 'o' is the pixel data (corresponding to the (n+1)-ranked coded data when the pixel data obtained by the aftermentioned frame predictive coding tool of sampling per ¼ pixel is assumed as the n-ranked coded data) produced by the frame predictive coding tool (corresponding to the (n+1)-ranked coding tool when the aftermentioned frame predictive coding tool of sampling per ¼ pixel is assumed as the n-ranked coding tool) of sampling per ½ pixel. Of these, the pixel data for the pixels indicated by '+' is equivalent to the pixel data obtained by the frame predictive coding tool of sampling per single pixel, while the pixel data for the pixels indicated by 'o' is the interpolated pixel data which has been predicated based on image data A to D.

In FIG. 7C, pixel data $a_4$ to $y_4$ for the pixels indicated by '+' 'o' 'Δ' is the pixel data produced by the frame predictive coding tool of sampling per ¼ pixel. Of these, the pixel data for the pixels indicated by '+' and 'o' is equivalent to the pixel data obtained by the frame predictive coding tool of sampling per ½ pixel. The pixel data for the pixels indicated by '+' is equivalent to the pixel data obtained by the frame predictive coding tool of sampling per single pixel, while the pixel data for the pixels indicated by 'o' and 'Δ' is the interpolated pixel data which has been predicated based on image data A to D.

As understood from FIGS. 7A to 7C, pixel data $a_2$ to $i_2$ obtained by the frame predictive coding per ½ pixel sampling, includes pixel data $a_1$, to $d_1$, (image data A to D) obtained by the frame predictive coding per single pixel sampling, therefore the pixel data is distributed four times as dense as that of sampling pixels of the video signal. Pixel data $a_4$ to $y_4$ obtained by the frame predictive coding per ¼ pixel sampling, includes the pixel data obtained by the frame predictive coding per single pixel sampling and per ½ pixel sampling, therefore the pixel data is distributed sixteen times as dense as that of the sampling pixels of the video signal.

In this way, the pixel data obtained by the inter-frame predictive coding tools for producing the pixel data of high-density display pixels, hierarchically includes the pixel data obtained by the frame predictive coding tools for producing the pixel data of the lower density display pixels. For instance, pixel data $a_4$ to $y_4$ obtained by the frame predictive coding tool of sampling per ¼ pixels hierarchically includes pixel data $a_2$ to $i_2$ as well as pixel data $a_1$ to $d_1$.

FIGS. 8A to 8C are illustrations explaining the effects on the image display by the inter-frame predictive coding and showing the display images of a pattern TA obtained by decoding the coded data based on the inter-frame predictive coding per single pixel sampling, per ½ pixel sampling and per ¼ pixel sampling, respectively. In FIGS. 8A to 8C, 'o' and '•' represent pixels of 'light' and 'dark' display states, respectively when the coded data obtained by subjecting the video signal of pattern TA as a subject to the inter-frame predictive coding is decoded. Here, in FIGS. 8A to 8C, pattern TA as a subject is assumed to move in the lower right direction, and for easy understanding of the positional relation between pattern TA and the pixels, display images are laid over the pixels, for reference.

Referring to FIGS. 8A through 8C, according to the frame predictive coding per single pixel, pattern TA is represented with three pixels before movement and with one pixel after movement. On the other hand, according to the frame predictive coding per ½ pixel, pattern TA is represented with six pixels before movement and with three pixels after movement. Further, according to the frame predictive coding per ¼ pixel, pattern TA is represented with fifteen pixels before movement and with ten pixels after movement. In this way, as the dividing number of the pixels in the frame predictive coding is increased so that the density of the display pixels at the decoder side is increased, it becomes possible to reproduce an image of high quality with high precision.

Next, description will be made of a means for practicing the decoding scheme by the combination of individual functional tools (functional modules) independent of one another in the coder described above.

FIG. 9 shows an example of a coding data stream to be used when the coded data based on H.261 is transmitted to a device which does not have the decoding function based on H.261. As stated above, since it is assumed that the coding scheme is not invariant and the combination of the functional tools in the coder can be freely selected, it is necessary to transmit the information of the type of the coding scheme based on which the signal was coded and the types of the functional tools used in the coding process (this information will hereinbelow be referred to as coding information), together with the coded data. In FIG. 9, the data stream includes: coding information composed of motion compensation tool 112a, inverse transforming tool 112b, quantizing tool 112c and decoding scheme constructing information 111; and coded data of motion vector information 113a, transform coefficient 113b and quantization step 113c, which follow the corresponding coding information. The aforementioned each of the functional tool 112a to 112c designate the orders of decoding corresponding coded data 113a to 113c, and may contain operation specifications in some cases, may just indicate the identifying numbers of the functional tools in the other cases. Decoding scheme constructing information 111 specifies the functional tools to be used and the methods of using the resultant outputs from the tools, and other information. In the case shown in FIG. 9, the result after the motion compensation is used to handle the data of a certain image block decoded right before, for instance. That is, this result indicates the information relating to the order of procedure of the coding scheme H.261 in this case. The device on the decoding side, which has received the coding data stream shown in FIG. 9, is able to construct the decoding scheme by interpreting the decoding scheme constructing information, the motion compensation tool, the inverse transforming tool and the quantizing tool so that it can exactly decode the decoded data that follows.

As stated above, the coding information may contain the processing order of the tools and how to use the result obtained from each tool etc., so that the decoder will be able to decode the received coded data even if the signal which requires tools or is based on a decoding scheme that is not provided on the decoder side, is received. In order to improve the efficiency in the use of the line, however, it is preferable to use a decoding scheme which is able to work with a less amount of data to be transmitted such as the specifications on the construction of the decoding scheme and the tool information. In practice, since the purpose of the usage and the required quality will be determined to a certain degree depending on the coding and decoding apparatus, it is realistic that each coding and decoding apparatus has a number of coding and decoding schemes, in advance, which are expected to be used more frequently.

FIG. 10 shows an example of the coding data stream which can be used for the communication between two devices both having some coding and decoding schemes which are expected to be used more frequently. For the coding information, the same decoding scheme incorporated in the decoder is called up by transmitting a predetermined identification code 121a so that the coded data received can be decoded. Comparing with the example of FIG. 9, since this method will not need the transmission of the information on functional tools and the decoding scheme constructing information, it is possible to drastically reduce the transmitted amount of data and therefore the improvement of the efficiency in the use of the communication line can be expected.

However, if the divided number of pixels in the frame predictive coding is dissimilar (or the frame predictive coding tools are different), the structure of the coded data becomes quite different and thus it becomes impossible to interchange the coded data. For this reason, in accordance with the conventional coding and decoding system (method and devices), the decoding side needs to perform its decoding operation using a decoding tool suitable to the structure of the coded data. That is, the decoding tool should have the decoding capacity in one-to-one correspondence to the coding capacity for the coding tool to perform the decoding operation. Therefore, when the processing capacity for the decoding tool is not in agreement with that for the coding tool, it is totally impossible to decode the coded data received.

When the data which is coded using an algorithm provided with various tools (represented by MPEG4, for example) is attempted to be decoded by the device just having a single algorithm such as MPEG1, the decoding side needs additional hardware and/or software for operating the algorithm (coding tools) used in the coding. Therefore, the device is increased in size and cost.

As seen also in the H.261 coding scheme etc., the detailed specifications of the coding scheme is usually switched depending on which is more important, the efficiency of coding or the quality of image, or depending upon the nature etc., of the input image. Further, the usage will be limited if the system has only limited types of coding schemes previously equipped, as stated above. Therefore, it becomes necessary to change over the coding scheme in accordance with the usage. In this case, if the coder side tries to transmit data coded based on the scheme that is not equipped on the decoder side, the coding information should be simultaneously transmitted, as already mentioned above. At this moment, in accordance with the aforementioned method, all the coding information, as shown in FIG. 9, including the information of the functional tools used in the decoding scheme previously provided in the decoder side, needs to be transmitted regardless of whether the difference of the decoding scheme from the coding scheme is small or great. That is, even when the coding scheme is not much different from the decoding scheme that is previously provided, the communication may require a large transmission rate, thus possibly reducing the efficiency in the use of the line. In practice, however, since there are some functional tools which can be commonly used with little dependence on the difference in coding schemes, such as the transform coding in the motion picture, etc., it is possible to develop different kinds of coding schemes by adding other functional tools to the basic functional tools as such.

Further, in recent years, it has become possible to download the tools for JPEG and MPEG1 stated above, on the personal computer communications network etc., and receive image signal and decode it based on the downloaded tools. Therefore, it can be guessed readily that in the near-future video communications, the communication will be able to be performed by downloading the tools for coding and decoding. However, in the aforementioned coding and decoding system of the conventional scheme, the communication can be performed based only on the limited kinds of coding and decoding algorithms. In the case of the next generation image coding scheme (such as MPEG4) which can flexibly deal with various applications and can code the signal in the most suitable manner to each of the applications, if several kinds of algorithms are tried to be processed by a scheme which performs coding with a fixed algorithm such as JPEG, H.261, MPEG1, MPEG2, etc., it becomes necessary to provide hardware and/or software for executing each algorithm. In this way, it is preferable that all the various kinds of algorithms are provided for both the transmitting and receiving sides. However, if all the tools are provided to deal with all the algorithms, the hardware and software becomes bulky, and the apparatus will increase in cost and inevitably becomes large. On the other hand, if the apparatus is reduced in cost and size and therefore the apparatus does not have adequate capacities, the risk of the failure to perform communications becomes high.

In the coding and decoding apparatus which does not have the above capacity, the decoder will download the tools for the required algorithm so as to be able to flexibly deal with the various kinds of applications and decode the signal. In such a coding and decoding apparatus which downloads the tools for the algorithm and is able to store the tools previously used, if the tools stored are not the ones which are required for the next communication, the required tools must be downloaded again before the transmission of the coded data. Therefore, the delay before the start of transmission to the decoding of the coded data becomes long.

In the above coding and decoding apparatus which is able to store the tools previously used, if the coding and decoding tools are provided in such a hierarchical manner that the tools for high quality is provided at the lower rank and the tools for assuring minimum quality which are not replaceable with other tools are provided at the higher rank, it becomes possible to decode the signal using those tools for minimum quality even if the capacity of the decoding apparatus is different from that of the coding apparatus. In this case, the delay before the start of transmission due to the downloading of the tool information can be eliminated, however it is impossible to decode the signal with the anticipated quality. In this case, when the signal is decoded with the anticipated quality, it is necessary to previously download the tools for the anticipated quality. Therefore, the situation is quite similar to the case where the tools are not provided in the hierarchical manner. That is, the delay before the start of transmission to the decoding of the coded data becomes long and therefore it is impossible to make use of the merit from the hierarchical structure of the tools.

SUMMARY OF THE INVENTION

The present invention has been achieved in view of the above problems. It is therefore an object of the invention to provide a coding and decoding apparatus which can select the most suitable tools based on the comparison with the tool-correspondent information and can perform the decoding operation efficiently and quickly when the received coded data is decoded using the tools simultaneously received.

It is another object of the invention to provide a coding and decoding apparatus which is able to decode the coded data even if the coding capacity of the coding tools on the coding side is not in agreement with the decoding capacity of the decoding tools on the decoding side so that the apparatus on the decoding side can be reduced in size and price.

It is a further object of the invention to provide a coding and decoding apparatus in which, by transmitting only the differential information as to the functional tool and the decoding scheme which are already prepared in the decoding apparatus when the decoding scheme is transmitted, it is possible to designate and identify the necessary decoding scheme with fewer steps, so that the efficiency in the use of the communication line will not be deteriorated critically.

It is still another object of the invention to provide a coding and decoding apparatus of the next-generation image coding scheme, in which the coding apparatus on the transmitting side simultaneously transmits the decoding tool information and the coded data when the decoding apparatus on the receiving side has no decoding tools which are requested by the transmitting side, thus making it possible to save the time which would be required for downloading only the tool information and thereby shorten the time before the start of the transmission of the coded data, compared with the configuration which initially transmits tool information only, and then downloads this information and thereafter starts decoding by using the thus downloaded decoding tools.

In order to achieve the above object of the invention, the gist of the invention can be represented as follows:

In a coding and decoding apparatus of a first aspect of the invention where the coder transmits coded data together with identifying information for identifying the means of decoding the coded data, and the decoder is capable of storing a plurality of decoding schemes so as to perform decoding based on one of the previously stored schemes, in order that the coded data and the information of the tools which constitute the algorithm as the means of decoding the coded data can simultaneously be transmitted, the received tools can be reconstructed into the algorithm and the received coded data can be decoded based on the algorithm. The coding and decoding apparatus comprises: a tool storage for storing tools; a tool-correspondent information storage for storing the information corresponding to the tools; a comparing device for comparing the tool-correspondent information received with the information stored in the tool-correspondent information storage; and a selection controller for selecting the optimal tool from the tool storage based on the result from the comparing device to perform the processing with the selected one. The apparatus is constructed such that the coded data, tool information and tool-correspondent information are all transmitted simultaneously, and the coded data is decoded using the tool selected based on the received tool-correspondent information.

A second aspect of the invention resides in a coding and decoding apparatus having the first feature and is characterized in that the tool-correspondent information comprises the processing capacity of each tool, and the processing capacity of the received tool is compared to a decoding capacity stored in the tool-correspondent information storage so that the tools whose capacities fall within the range of the decoding capacity are selected.

A third aspect of the invention resides in a coding and decoding apparatus having the second feature and is characterized in that the processing capacity of the tool is numerically represented and transmitted.

A fourth aspect of the invention resides in a coding and decoding apparatus having the second feature and is characterized in that the tool-correspondent information storage includes a decoding capacity storage section for setting up a decoding capacity of the decoding apparatus and storing it and a coding capacity storage section for storing each of coding capacities of the tools transmitted from the coding apparatus, and the comparator comprises a capacity comparator which compares the coding capacity with the decoding capacity so as to judge whether the transmitted tool is processible.

A fifth aspect of the invention resides in a coding and decoding apparatus having the first feature and is characterized in that the tool-correspondent information comprises keys unique to different tools, and received keys are compared to the keys stored in the tool-correspondent storage so as to select the corresponding tools and operate the selected tools.

A sixth aspect of the invention resides in a coding and decoding apparatus having the first feature and further comprises a response controller for requesting the coding apparatus on the opposite side to transmit the tool information only when tool information is required.

Next, in a coding and decoding apparatus of a seventh aspect of the invention where the coder transits coded data together with identifying information for identifying the means of decoding the coded data, and the decoder is capable of storing a plurality of decoding schemes so as to perform decoding based on one of the previously stored schemes, the apparatus is characterized in that n-ranked (n: a positive integer) coded data which is produced using an n-ranked coding tool and decoded using an n-ranked decoding tool has a hierarchical structure which includes (n+1)-ranked coded data which is produced using an (n+1)-ranked coding tool and decoded using a (n+1)-ranked decoding tool, the coder having an n-ranked coding tool is composed of: a coder which produces the n-ranked coded data using the n-ranked coding tool; and an identifier adder which attaches N-ranked identifiers (N: a positive integer satisfying $N \geq n$) to N-ranked coded data which is included in the n-ranked coded data but is other than (N+1)-ranked coded data included in the N-ranked coded data, and the decoder having an m-ranked (m is a positive integer satisfying m>n) decoding tool is composed of: a data reconstructer which extracts the N-ranked coded data which is attached with the N-ranked identifiers where $N \geq m$, from the n-ranked coded data; and a decoder which decodes the m-ranked decoded data using the m-th decoding tool.

An eighth aspect of the invention resides in a coding and decoding apparatus having the feature of the seventh aspect and is characterized in that the coding tool is an frame predictive coding tool and the decoding tool is an frame predictive decoding tool.

Further, in a coding and decoding apparatus of a ninth aspect of the invention where the coding side transmits coded data together with identifying information for identifying the means of decoding the coded data, and the decoding side is capable of storing a plurality of decoding schemes so as to perform decoding based on one of the previously stored schemes, the coding and decoding apparatus is characterized in that when the coded data and the coding information which includes a decoding scheme as the means of decoding the coded data and functional tools constituting the decoding scheme are simultaneously transmitted, the decoding side receives the coding information and reconstructs the decoding scheme based on the coding information received, and the received coded data is decoded based on the reconstructed decoding scheme, an identification code of a previously defined basic decoding scheme and the differential information from the basic decoding scheme are transmitted as the coding information from the coding side so that the decoding side will recognize the decoding scheme required therefor.

A tenth aspect of the invention resides in a coding and decoding apparatus having the ninth feature and is characterized in that the coding apparatus comprises: a database of coding schemes for storing plural kinds of coding schemes and functional tools which constitute the coding schemes; a coding scheme selector for selecting the coding scheme based on input data; a coding section for performing a coding process of the input data in conformity with the determined coding scheme; and a coding controller for controlling each section.

An eleventh aspect of the invention resides in a coding and decoding apparatus having the ninth feature and is characterized in that the decoding apparatus comprises: a database of decoding schemes for storing plural kinds of decoding schemes and functional tools which constitute the decoding schemes; a decoding scheme constructing section for reconstructing the decoding scheme in accordance with the received coding information; a decoding section for performing a decoding process of the received data in conformity with the reconstructed decoding scheme; and a decoding controller for controlling each section.

A twelfth aspect of the invention resides in a coding and decoding apparatus having any one of the ninth through eleventh features and is characterized in that the identification code of a basic decoding scheme and the information that one or some kinds of functional tools will be added to the basic decoding scheme, are transmitted as the coding information, so that the decoding scheme incorporated in the decoding side can be expanded for use.

A thirteenth aspect of the invention resides in a coding and decoding apparatus having any one of the ninth through eleventh features and is characterized in that the identification code of a basic decoding scheme and the information that one or some kinds of functional tools will not be used, are transmitted as the coding information so that the decoding scheme incorporated in the decoding apparatus can be simplified for use.

A fourteenth aspect of the invention resides in a coding and decoding apparatus heaving any one of the ninth through eleventh features and is characterized in that the identification code of a basic decoding scheme and the information that one or some kinds of functional tools will be replaced with another or others, are transmitted as the coding information so that the decoding scheme incorporated in the decoding apparatus can be modified for use.

A fifteenth aspect of the invention resides in a coding and decoding apparatus having any one of the ninth and tenth features and is characterized in that when the coding information is transmitted, if there are a number of combinations of selectable coding information, the combination which minimizes the transmitted amount of information will be selected for transmission.

Next, in a coding and decoding apparatus of a sixteenth aspect of the invention where the coding side transmits coded data together with identifying information for identifying the means of decoding the coded data, and the decoding side is capable of storing a plurality of decoding schemes so as to perform decoding based on one of the previously stored schemes, the coding and decoding apparatus is characterized in that: before transmitting the coded data to the decoding apparatus, the coding apparatus transmits the tools constituting an algorithm as the means of decoding the coded data, and the decoding apparatus reconstructs the algorithm using the tools so as to decode the received coded data based on the algorithm and stores the tools therein; when the decoding apparatus receives the coded data which has been coded by the same tools, the decoding side decodes the coded data using the tools previously stored and the tools are defined in a hierarchical manner so that in place of a tool for a certain rank, the higher-ranked tool can be used to secure the minimum quality of the operation; and the coding apparatus on the transmitting side simultaneously transmits the decoding tool information and the coded data if the decoding apparatus on the receiving side does not have the decoding tool requested by the transmitting side.

A seventeenth aspect of the invention resides in a coding and decoding apparatus having the sixteenth feature and is characterized in that when the decoding apparatus on the receiving side has no decoding tool requested by the coding apparatus on the transmitting side, the transmitting side temporarily changes the coding scheme using the coding tool that is in conformity with the decoding tool present on the receiving side.

An eighteenth aspect of the invention resides in a coding and decoding apparatus having the sixteenth feature and is characterized in that when the decoding apparatus on the receiving side has no decoding tool requested by the coding apparatus on the transmitting side, the receiving side, whilst downloading the decoded tool transmitted from the transmitting side to construct the requested decoding tool, temporarily decodes the coded data using a substitutable higher-ranked tool which is lowered in quality but still is able to perform decoding.

A nineteenth aspect of the invention resides in a coding and decoding apparatus having the eighteenth feature and is characterized in that after the decoding tool requested has become prepared, the receiving side starts the decode operation using the requested decoding tool.

According to the invention, the most suitable tools are selected based on the comparison between the tool-correspondent information stored in the tool-correspondent information storage and the received tool-correspondent information. Thus, it becomes possible to perform the decoding operation efficiently and quickly. Particularly, an effective decoding operation is attained because the processing capacities for the tools are used as the tool-correspondent information and the tools, whose capacities fall within a permissible range for the decoding operation, are then selected. In this case, by transmitting the processing capacity which is numerically represented, it becomes possible to efficiently make a quick comparison in capacities.

Further, it becomes possible to perform a quick selection of the tools because, by making the tool-correspondent information easy to compare, the tools themselves do not need to be compared. Especially, the comparison and selection of the tools in the tool storage can be performed quickly and effectively by allotting a unique key to each tool as the tool-correspondent information.

Since the response controller is provided, only when there is a necessity for a tool, it is possible to cause the coding apparatus on the other side to transmit the information of the tool. Thus, it is possible to shorten the time for transmission and reception and thereby perform the process efficiently.

Further, since the coding and decoding tools are defined hierarchically, and the data which conforms to the processing capacities of the thus hierarchically defined tools is attached with headers for identifying the processing capacity of the tool on the coding side, the data can be reconstructed so as to have a data structure which conforms to the processing capacity of the decoding side and can be decoded. As a result, even if the processing capacities of the coding and decoding tools are not compatible, it is possible to decode the coded data.

It becomes no more necessary for the decoding side to have all of various tools in order to deal with the data which is coded by such an algorithm having various coding and decoding tools as a next-generation coding standard represented by MPEG4. Therefore, it is possible to reduce the cost of the apparatus.

Further, since it is possible to alleviate the restriction on the hardware of the decoding apparatus, it becomes possible for a simple low-cost apparatus to decode the data coded based on the next-generation coding standard.

In accordance with the scheme described above, the coding information, within the coding data stream transmitted from the coding apparatus, used for decoding the coded data is made up of only the identification code of the basic decoding scheme and the differential information with respect to the basic decoding scheme. Expanded decoding schemes from the basic decoding scheme can be represented by the differential information. That expansion of the basic decoding scheme is formed by designating the functional tools to be added to, canceled from or replaced in the basic decoding scheme. Further, if there are two or more methods in designating the differential information, the designating method which requires less amount of information is selected so that the amount of data to be transmitted becomes minimum.

Further, in the coding and decoding apparatus described above, even if the receiving side has not tool having requested quality at the time of the first transmission, the transmitting side starts coding and the receiving side starts decoding using other tools which are lower in quality as compared with the requested tools but still replaceable. The transmitting side simultaneously transmits the requested tools and the thus obtained coded data to the receiving side. The receiving side downloads the requested tools and prepares the tools whilst decoding the coded data using the other tools which are lower as compared with the requested tools in quality but still replaceable. When the establishment of the requested decoding tools is completed, the image communication with high quality requested will start.

BRIEF DESCRIPTION OF THE DRAWINGS

The present invention will become more fully understood from the detailed description given herein below and the accompanying drawings which are given by way of illustration only, and thus, are not limitative of the present invention and wherein:

FIG. 2 is a block diagram showing the configuration of coder based on H.261;

FIG. 21A is a diagram showing the data structure of a bottom-ranked coded data which is added with headers in conformity with the rank of the frame predictive coding tool used;

FIG. 21B is a diagram showing the data structure of FIG. 21A in which headers are attached only to the leading part of pixel data;

FIG. 22 is an operational flowchart for explaining the operation of an frame predictive decoder;

DESCRIPTION OF THE PREFERRED EMBODIMENTS

The embodiments of the present invention will hereinafter be described with reference to the accompanying drawings.

First Embodiment

Figure 11:
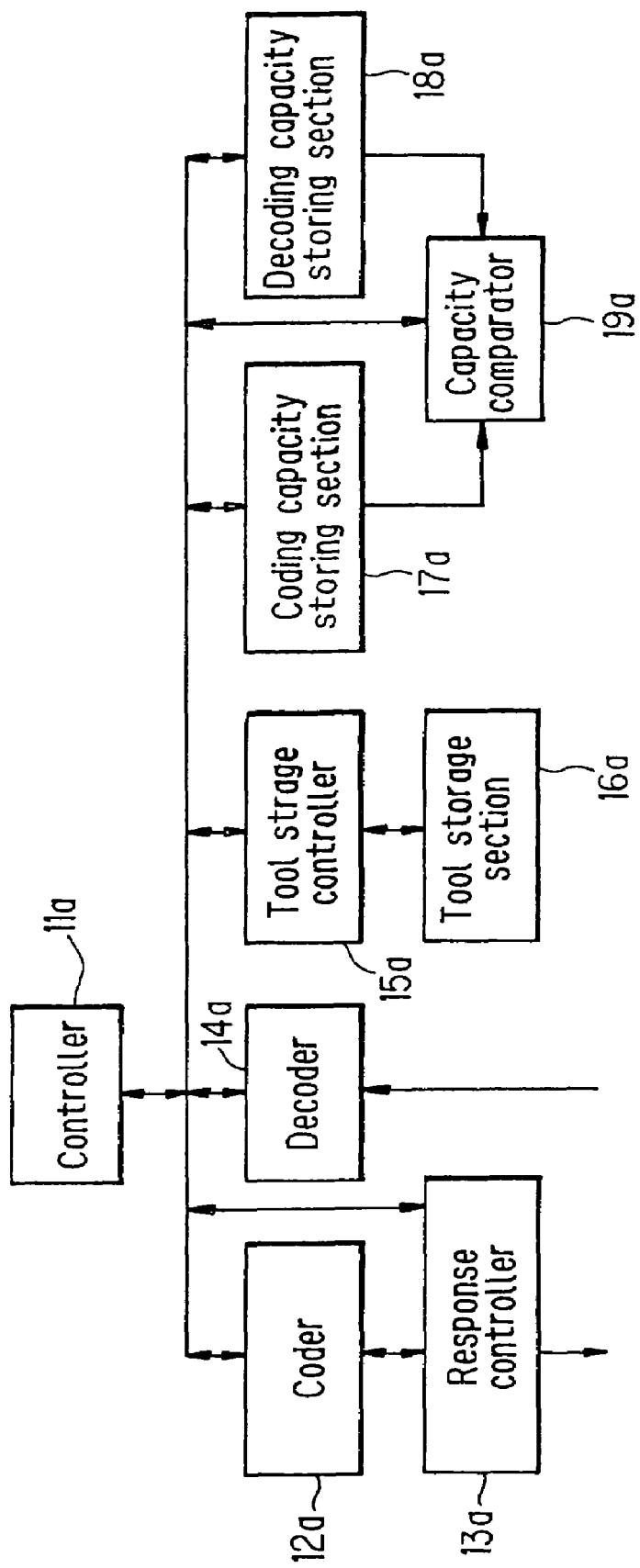
FIG. 11 is a block diagram showing the first embodiment of a coding and decoding apparatus in accordance with the invention.

FIG. 11 is a block diagram showing the first embodiment of a coding and decoding apparatus in accordance with the invention. This coding and decoding apparatus includes a controller 11a, a coder 12a, a response controller 13a, a decoder 14a, a tool storage controller 15a, a tool storage section 16a, a coding capacity storing section 17a, a decoding capacity storing section 18a and a capacity comparator 19a.

Controller 11a is a unit for controlling the entire apparatus. The total amount of the processing capacities for the tools in decoder 14a which constitute the algorithm is stored previously in decoding capacity storing section 18a as a decoding capacity. The processing capacity for each tool in decoder 14a is represented numerically. Coder 12a transmits each tool together with its numerical processing capacity required for the tool to the other terminal device.

Here, the capacity for a tool is represented numerically by selecting a standard operation step, determining the processing capacity for performing the standard operation step and comparing the processing load and capacity for the operation step of the tool with that of the standard operation step.

The capacity for a tool is not numerically rated by coder 12a whenever the tool is transmitted but is designated previously by the implementer or by the selector based on its processing load. The numerical capacity is sent from controller 11a to the response controller where it is multi-processed with coded data and tool information so as to be transmitted.

Coding capacities received by decoder 14a are stored into coding capacity storing section 17a by individual tools which constitute the algorithm. The output from decoding capacity storage section 18a and the sum of the processing capacities for the tools constituting the algorithm are both inputted to capacity comparator 19a.

Capacity comparator 19a compares the two values so as to judge whether the operation of the algorithm using the tool received is permissible in the apparatus. The judgment can be made by means of a simple big-or-small comparator. If the operation can be determined as allowable from the comparison of the processing capacity, a permissible signal is sent out to tool storage controller 15a and the tool received is stored in tool storage section 16a so that it can be used for decoding the data which follows.

If, from the comparison of the processing capacity, the decoding capacity of the apparatus is determined to be low to store the tool or the operation of the tool is determined as impermissible, the received tool is not useful so that a storage impermissible signal is sent out to tool storage controller 15a so as to prohibit the storage of the tool into tool storage section 16a. At the same time, instructions for transmitting the confirmation of whether the received tool can be downloaded for use are sent out to response controller 13a.

In general, in a coding scheme wherein the classification of the tools constituting its algorithm is defined, the decoding capacities on both sides are exchanged at the initial stage of the communication so that coding of data and transmission will be started after obtaining the decoding capacities of the other terminal devices. However, in a scheme wherein coded data is transmitted from the coding side together with tools constituting the algorithm for decoding the coded data, the load for the decoding process will remarkably vary depending upon the classification of the selected tools. Therefore, it is not considered that the capacity exchange of this kind is useful for previously obtaining the exact decoding capacity of the other terminal end. Therefore, in the latter scheme (the scheme of the invention), whenever a new tool is received, the capacity for the tool will be checked so as to determine whether the tool can be handled and the determined result will be transmitted to the opposite terminal.

Figure 12:
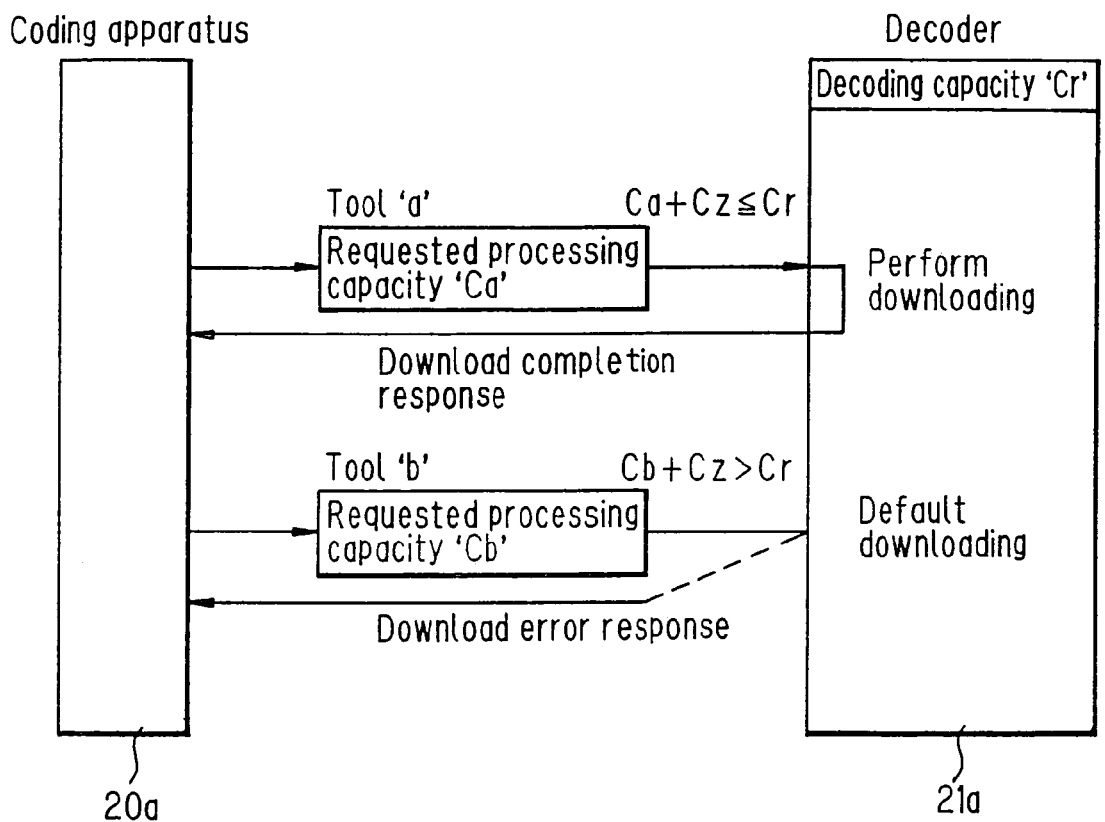
FIG. 12 is an illustrative diagram showing the operation of the coding and decoding apparatus of the first embodiment.

FIG. 12 is an illustrative diagram showing an operational example of the invention. Now, the operations of a coding apparatus 20a and a decoding apparatus 21a a will be explained. Here, coding apparatus 20a and decoding apparatus 21a both are identical or composed of the coding and decoding apparatus shown in FIG. 11 and function as coding and decoding apparatuses, respectively.

First, it is assumed that coding apparatus 20a transmits a tool 'a' and its coding capacity 'Ca' required for handling tool 'a' to the decoding apparatus. Decoding apparatus 21a stores the processing capacity Ca for the tool transmitted into coding capacity storage section 17a. The capacities for the tools constituting the algorithm are stored by individual tools. If the sum of the capacities other than Ca is assumed to be Cz, the capacity required for the algorithm using the tool having capacity Ca can be represented by Ca+Cz.

This value is compared with a decoding capacity 'Cr' which is previously determined in decoding apparatus 21a. In this comparison, if Ca+Cz <Cr, then tool 'a' which has been just received is determined as permissible in the decoding side. If the tool can be used, it is downloaded and a signal indicating the completion of the download will be transmitted to the other side apparatus. Thus, coding apparatus 20a will be able to recognize that data using the tool transmitted therefrom can be transmitted.

Next, it is assumed that coding apparatus 20a transmits a tool 'b' and its coding capacity 'Cb' required for handling tool 'b' to the decoding apparatus. Decoding apparatus 21a stores the processing capacity Cb for the tool transmitted into coding capacity storage section 17a. The capacities for the tools constituting the algorithm are stored by individual tools. In the same manner as the above operation, the capacity required for the algorithm using the tool having capacity Cb can be represented by Cb+Cz.

This value is compared with decoding capacity 'Cr' which is previously determined. In this comparison, if Cb+Cz>Cr, then the tool which has been just received is determined as impermissible in the decoding side. In this case, the download of the received tool will not be performed and a signal indicating the download error will be transmitted to the other side apparatus. Thus, the coding apparatus will be able to recognize that data using the transmitted tool cannot be transmitted. In response to this, the coding apparatus will send another tool in place, or will transmit data using tool 'a' which has been transmitted already so that the data can be decoded.

As described above, the processing capacities for tools are used as the tool-correspondent information, and based on the processing capacities, tools are selected so that the capacities for the selected tools fall within a permissible range for the decoding operation. Thus, it becomes possible to efficiently perform the decoding operation. In this case, by transmitting the processing capacity which is numerically represented, it becomes possible to efficiently make a quick comparison in capacities. Further, since whether a received tool is permissible to use is judged based on the capacity of the tool and only the tool which is usable will be downloaded, it is possible to shorten the processing time required for the transmission and reception.

Second Embodiment

Table 2 shows an example of the control of tools in the second embodiment of a coding and decoding apparatus in accordance with the invention. As shown in Table 2, each tool is allotted with a unique key. For example, a tool for motion compensation with integer-pixel precision is assigned with a key Aa01. In the same manner, all the tools are allotted with corresponding keys so that each tool can be discriminated.

Figure 13:
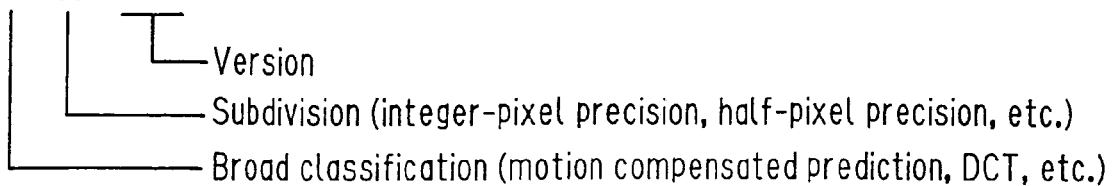
FIG. 13 is a diagram showing an example of a key assignment.

FIG. 13 shows an example of the key assignment. For instance, the key has a capital alphabetical character for broad classification (motion compensated prediction, DCT, etc.), a lowercase alphabetical character for subdivision (integer-pixel precision, half-pixel precision, etc.) and two digit numerals for version.

TABLE 2

| Key | Tool |
| --- | --- |
| Aa01 | Integer-pixel precision motion compensation |
| Ab01 | Half-pixel precision motion compensation |
| Ba01 | DCT |
| Bb01 | Wavelet transform |
| Ca01 | Linear quantization |
| Cb01 | Vector quantization |

Figure 14:
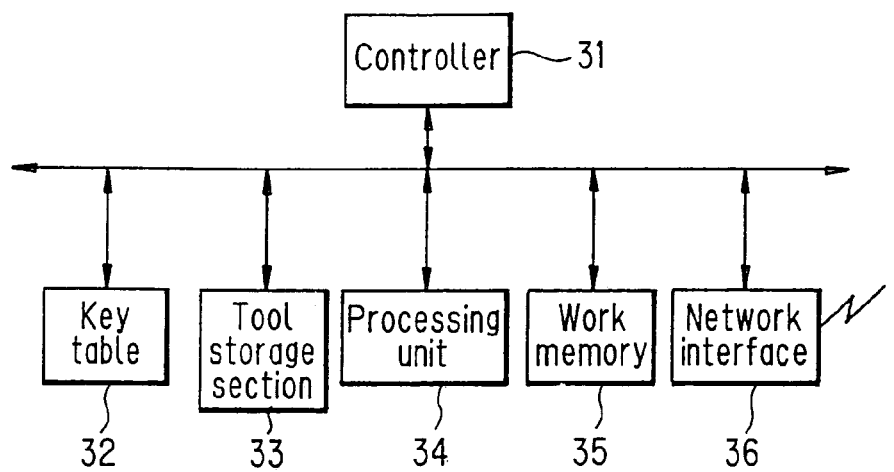
FIG. 14 is a block diagram showing a coding apparatus in a coding and decoding apparatus of the second embodiment in accordance with the invention.

FIG. 14 is a block diagram showing a coding apparatus of the second embodiment in a coding and decoding apparatus in accordance with the invention. This coding apparatus includes: a controller 31 for controlling the entire apparatus; a tool storage section 33 for storing tools; a key table 32 for storing the memory locations in tool storage section 33 wherein the processing programs for the tools corresponding to different keys are stored; a processing unit 34 which reads out a processing program for a tool from the tool storage section and executes it; a work memory 35 for processing unit 34; and a network interface 36 for performing communications with the outside.

Figure 15:
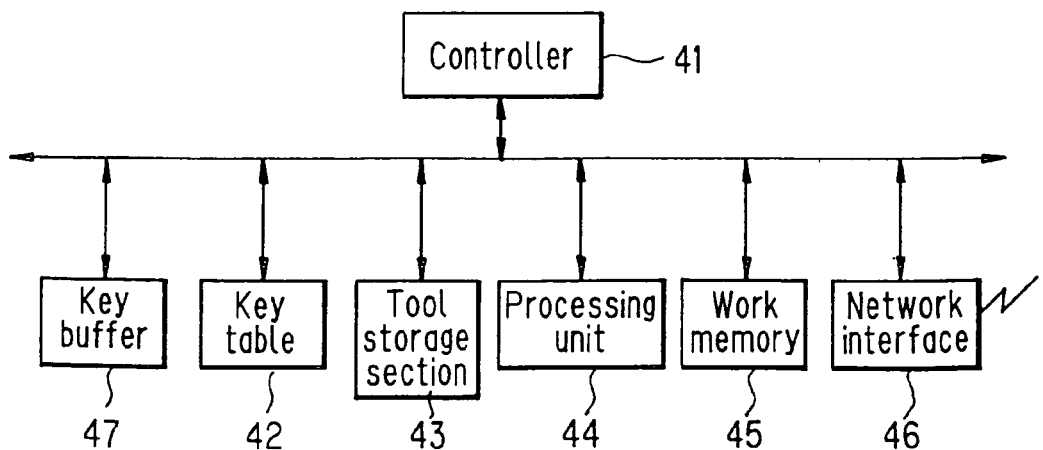
FIG. 15 is a block diagram showing a decoding apparatus in a coding and decoding apparatus of the second embodiment in accordance with the invention.

FIG. 15 is a block diagram showing a decoding apparatus of the second embodiment in the coding and decoding apparatus in accordance with the invention. This decoding apparatus includes: a controller 41 for controlling the entire apparatus; a key buffer 47 for temporarily storing a key received; a tool storage section 43 for storing tools; a key table 42 for storing the memory locations in tool storage section 43 wherein the processing programs for the tools corresponding to different keys are stored; a processing unit 44 which reads out a processing program for a tool from the tool storage section and executes it; a work memory 45 for processing unit 44; and a network interface 46 for performing communications with the outside.

Table 3 is an example of stored states of the tools in tool storage section 33 in the coding apparatus of FIG. 14 as well as in tool storage section 43 in the decoding apparatus of FIG. 15. Table 4 shows an example of the correspondence of each key in key table 32 of FIG. 14 or in key table 42 of FIG. 15 to the memory location in tool storage section 33 or 43 for the tool corresponding to the key.

Figure 16:
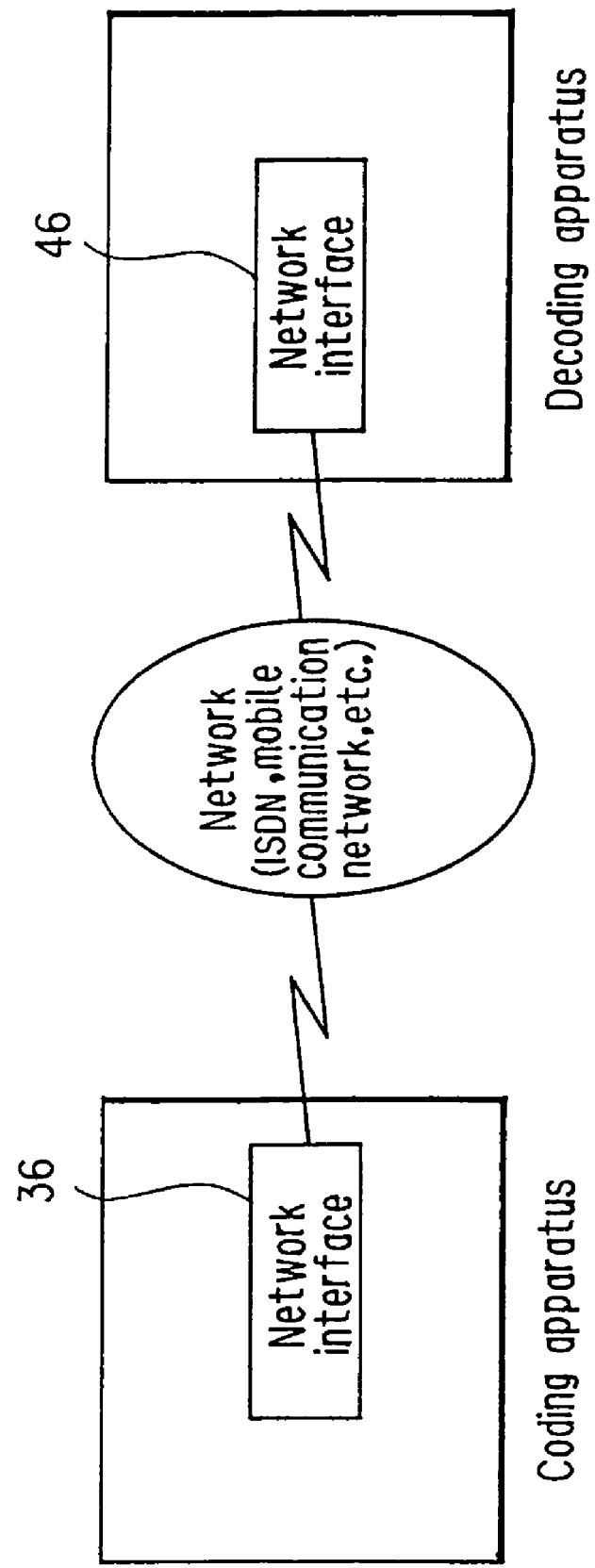
FIG. 16 is an illustration showing a coding apparatus and a decoding apparatus which are connected through a network.

The coding apparatus of FIG. 14 and the decoding apparatus of FIG. 15 can be connected through a network such as an ISDN, a mobile communication network, etc. by means of respective network interferances 36 and 46, as shown in FIG. 16.

TABLE 3

| File No. | Tool |
|---|---|
| 0 | Integer-pixel precision motion compensation |
| 1300 | Half-pixel precision motion compensation |
| 2500 | DCT |
| 4100 | Wavelet transform |
| 6000 | Linear quantization |
| 7700 | Vector quantization |

TABLE 4

| Key | Storage address |
|---|---|
| Aa01 | 0 |
| Ab01 | 1300 |
| Ba01 | 2500 |
| Bb01 | 4100 |
| Ca01 | 6000 |
| Cb01 | 7700 |

Figure 17:
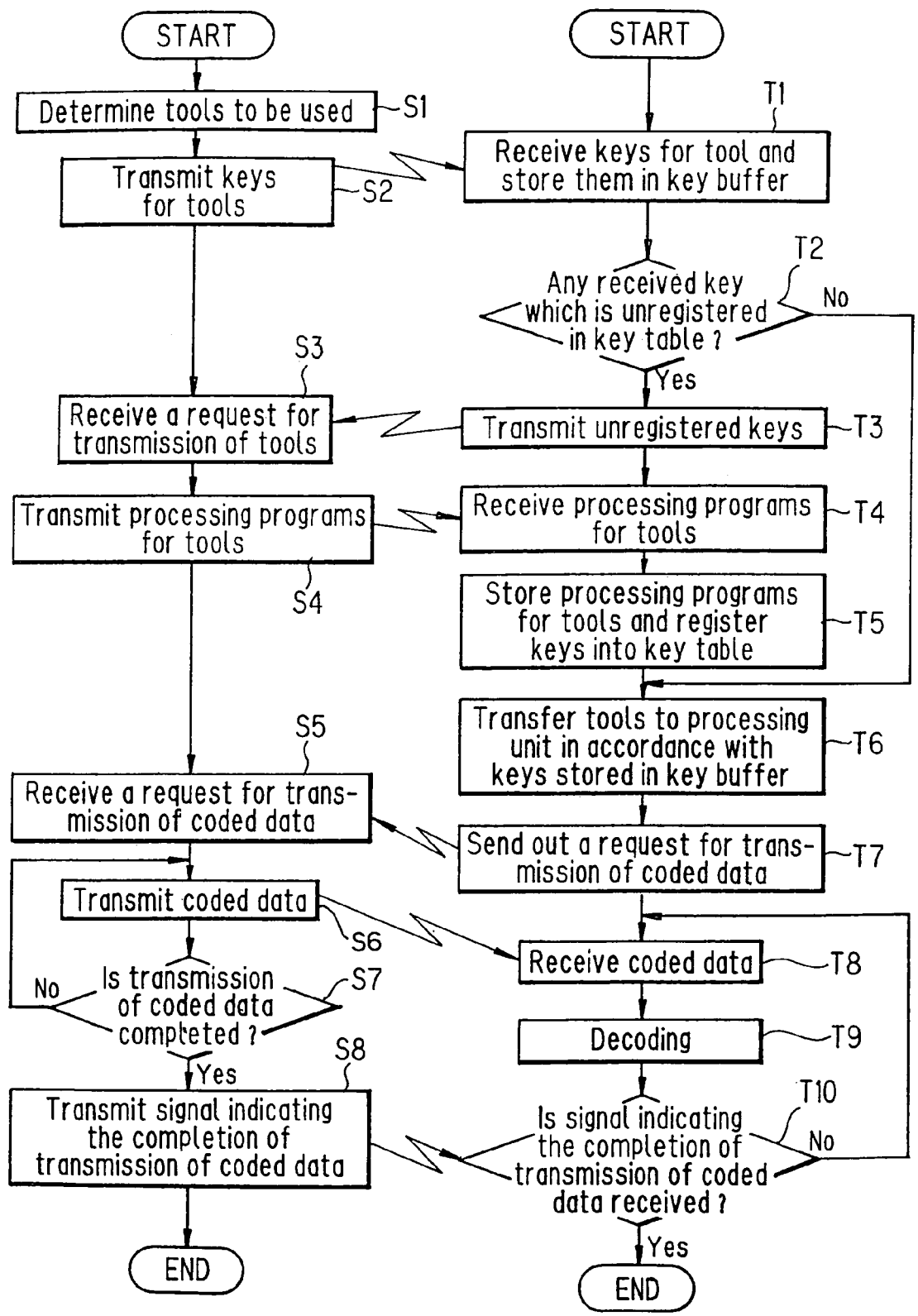
FIG. 17 is a flowchart showing the steps of communication when a coding apparatus and a decoding apparatus are connected.

FIG. 17 flowchart showing an example of the order of the communication step when the coding apparatus of FIG. 14 and the decoding apparatus of FIG. 15 are connected in the manner shown in FIG. 16. First, an algorithm used in the coding apparatus as well as tools for constructing the algorithm is determined (Step S1). Then, the keys for the tools are transmitted to the decoding apparatus (Step S2). The decoding apparatus receives the keys and picks them up into key buffer 47 (Step T1). The keys taken in to buffer 47 are compared to key table 42 (Step T2). If some of them are not registered, a request for tool transfer together with the keys is sent out to the coding apparatus (Step T3). The coding apparatus transmits the processing programs for the tools corresponding to the keys (Step S4). The decoding apparatus stores the processing programs for the tools in tool storage section 43 and registers the storage addresses with the keys into key table 42 (Step T5). Then, the decoding apparatus transfers the tools from tool storage section 43 to processing unit 44 with reference to key table 42 (Step T6). Next, the decoding apparatus sends out a request for coded data transfer to the coding apparatus (Step T7). Receiving the request, the coding apparatus transmits coded data to the decoding apparatus (Steps S5 and S6). The decoding apparatus receives the coded data (Step T8) and decodes it (Step T9). When the coding apparatus has completed the transmission of all coded data, it sends out a signal indicating the end of transmission of coded data to the decoding apparatus (Step S7 and S8). When the decoding apparatus receives the signal (Step T10), the communication is ended.

In the above way, by using a unique key for each tool as an identifier for comparison, it become possible to select the required tools in a simple manner, thus making it possible to reduce the processing time. Further, keys are used to judge whether the same tools are registered in the decoding apparatus, and only when there is no corresponding tool, the tool is transferred. Consequently, it is possible to reduce the processing time for transmission and reception.

As has been described, in accordance with this embodiment of the invention, the tool-correspondent information stored in the tool-correspondent information storage is compared with the received tool-correspondent information so as to comparatively select the most suitable tools. Accordingly, it is possible to perform the decoding operation at a high efficiency in a short time. Particularly, the processing capacities for tools are used as the tool-correspondent information, and based on the processing capacities, tools are selected so that the capacities for the selected tools fall within a permissible range for the decoding operation. Thus, it becomes possible to efficiently perform the decoding operation. In this case, by transmitting the processing capacity which is numerically represented, it becomes possible to efficiently make a quick comparison in capacities.

Further, since a simple and easily comparable identifier is used as the tool-correspondent information, it becomes possible to select required tools quickly without examining the content of tools. In particular, by allotting a key unique to each tool as the tool-correspondent information, it is possible to efficiently perform the process of comparatively selecting a tool from the tool storage means in a short time.

Since the response controller is provided, it is possible to cause the coding apparatus on the other side to transmit the information of the tool only when there is a necessity for the tool. Thus, it is possible to shorten the time for transmission and reception and thereby perform the process efficiently.

Third Embodiment

In reference to drawings, description will be made of a coding and decoding apparatus of the third embodiment of the invention hereinbelow in which a video signal is sampled per ¼ pixel by the frame predictive coding so that the coded data is transmitted and the transmitted data is decoded.

Figure 18:
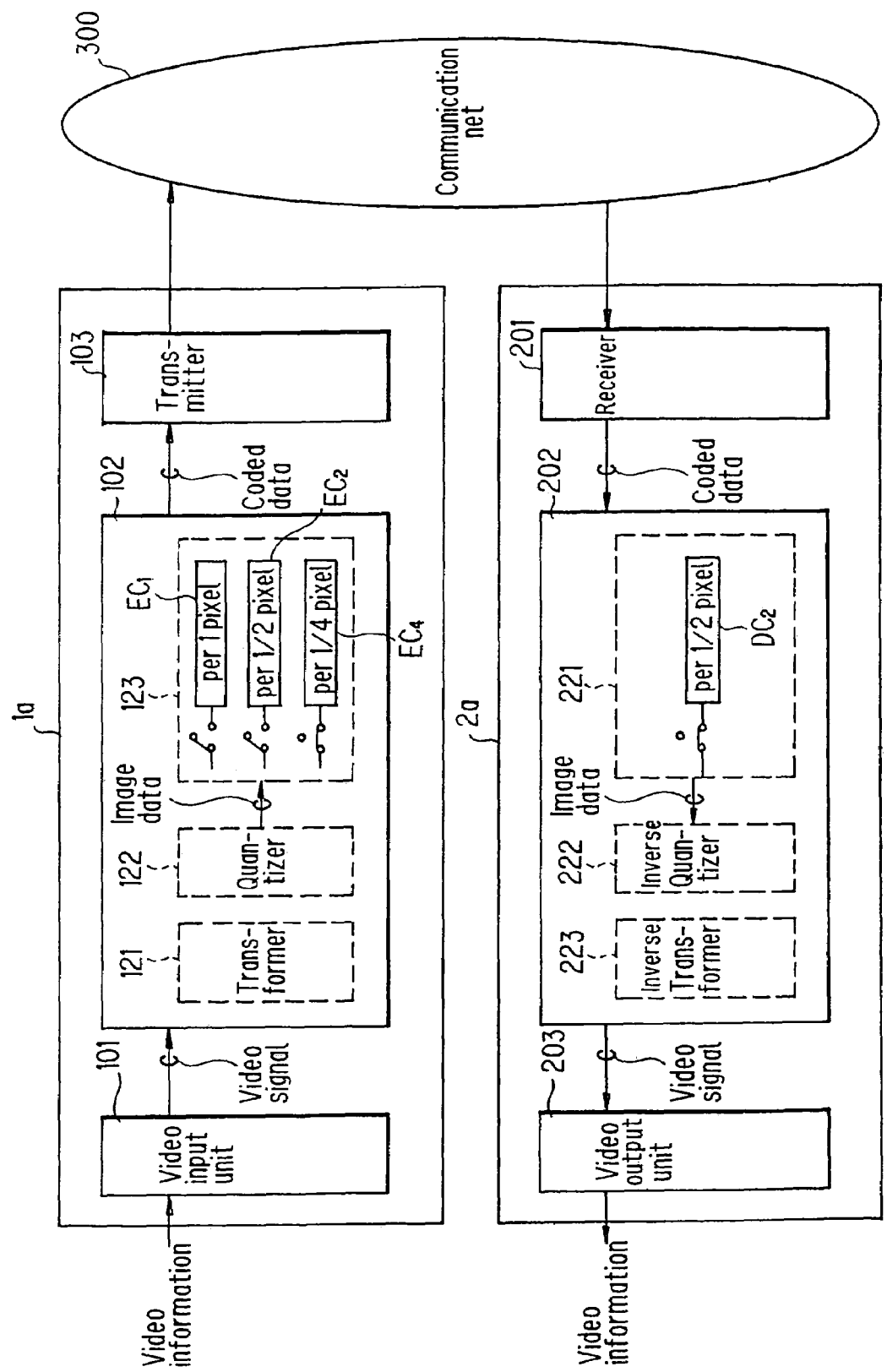
FIG. 18 is a system block diagram showing a configuration of an overall transmitting and receiving system which is applied to the third embodiment of a coding and decoding apparatus of the invention.

FIG. 18 is a system block diagram showing the configuration of an overall transmitting and receiving system to which a coding and decoding apparatus of the invention is applied. A transmitting system 1a shown in the figure includes: a video input unit 101 converting video information inputting through unillustrated visual sensor into a video signal; a coding apparatus 102 coding the inputted video signal from the video input unit 101 to produce coded data; a transmitter 103 outputting the coded data produced by coding apparatus 102 onto a communication net 300.

Here, coding apparatus 102 is composed of: a transformer 121 receiving the video signal and subjecting it to the DCT (Discrete Cosine Transform); a quantizer 122 quantizing the DCT coefficients obtained by the DCT in transformer 121; and frame predictive coder 123 receiving the video data quantized through quantizer 122 and subjecting it to an frame predictive coding process. Frame predictive coder 123 has an frame predictive coding tool $EC_1$, which samples the data per single pixel, an frame predictive coding tool $EC_2$ which samples the data per half pixel, and an frame predictive coding tool $EC_4$ which samples the data per quarter pixel, so that one of these frame predictive coding tools will be selected in accordance with the quality of display image required on the decoding side.

In the case of transmitting system 1a shown in FIG. 18, frame predictive coding tool $EC_4$ of sampling per ¼ pixel is selected in frame predictive coder 123. That is, the coding tool which provides the highest quality of display image is selected.

A receiving system 2a is composed of: a receiver 201 serving as the input interface for picking up the coded data of an image on communication net 300 which has been transmitted from transmitting system 1a; a decoding apparatus 202 receiving the coded data from receiver 201 and decoding it into a video signal; and video output unit 203 receiving the video signal from decoding apparatus 202 and displaying the video information on unillustrated monitor. Here, decoding apparatus 202 is composed of: an frame predictive decoder 221 subjecting the coded data to an frame predictive decoding process to produce image data; inverse quantizer 222 inverse quantizing the image data obtained by decoding from frame predictive decoder 221a nd providing DCT coefficients; and an inverse transformer 223 transforming the DCT coefficients produced by inverse quantizer 222 into a video signal. In the case of receiving system 2a shown in FIG. 18, frame predictive decoder 221 has only an inter-frame predictive decoding tool $DC_2$ which samples the data per half pixel.

The operations of coding apparatus 102 and decoding apparatus 202 will be described hereinbelow by explaining the operations of transmitting system 1a and receiving system 2a thus configurated.

First, the operation of transmitting system 1a will be described. Video input unit 101 converts video information inputted through a visual sensor such as a camera etc. into a video signal and supplies it to coding apparatus 102. The video signal inputted to coding apparatus 102 is converted into image data through transformer 121a nd quantizer 122. Frame predictive coder 123 receives the image data and subjects it to an frame predictive coding process to produce coded data. This coded data is supplied to transmitter 103. Transmitter 103 outputs the coded data onto communication net 300.

Here, frame predictive coder 123 produces coded data in a hierarchical structure in accordance with the coding capacity of the frame predictive coding tool used for coding. Before the detailed description of the operation of this frame predictive coder 123, the hierarchization of coded data will be explained. In hierarchizing coded data, the ranks of the frame predictive coding tools used for producing coded data are to be defined. That is, when the coded which is obtained by the first frame predictive coding tool for a certain rank contains the coded data which is obtained by the second frame predictive coding tool for another rank, the rank of the former frame predictive coding tool is defined to be lower than the rank of the latter frame predictive coding tool. According to this definition, the frame predictive tools of sampling per single pixel, per ½ pixel and per ¼ pixel belong to the top, medium and bottom ranks, respectively, based on the inclusionary relation of the coded data.

Figures 1A, 1B:
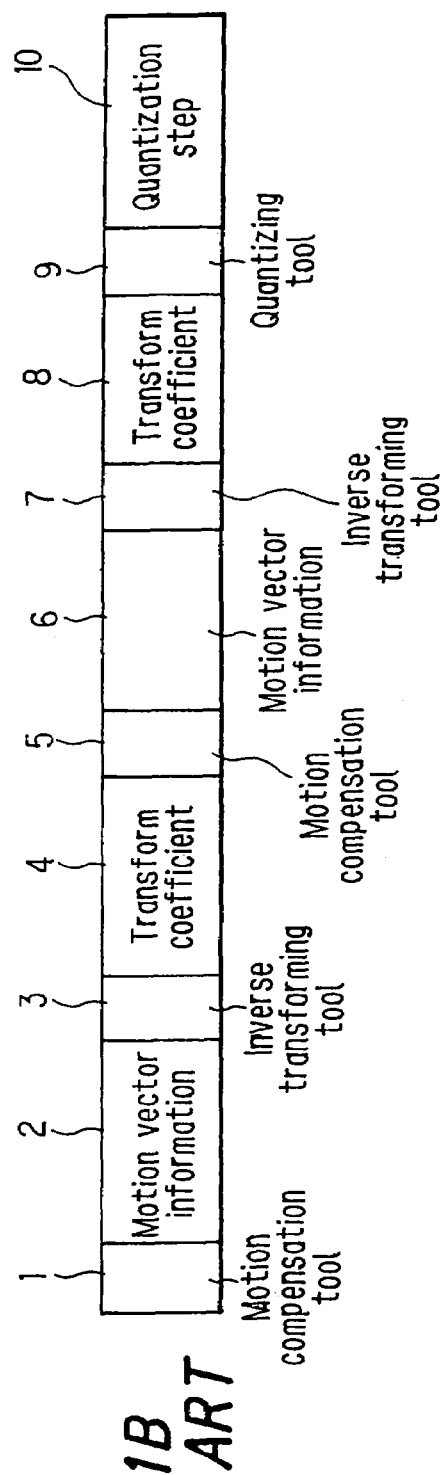
FIG. 1A is a conceptual view showing the structure of a coding data stream which is formed by coding (compressing) image data based on the H.261 scheme.
FIG. 1B is a conceptual view showing the structure of a coding data stream which is formed by coding (compressing) image data based on a coding scheme such as MPEG4 etc. whose algorithm is flexible.
Figure 1C:
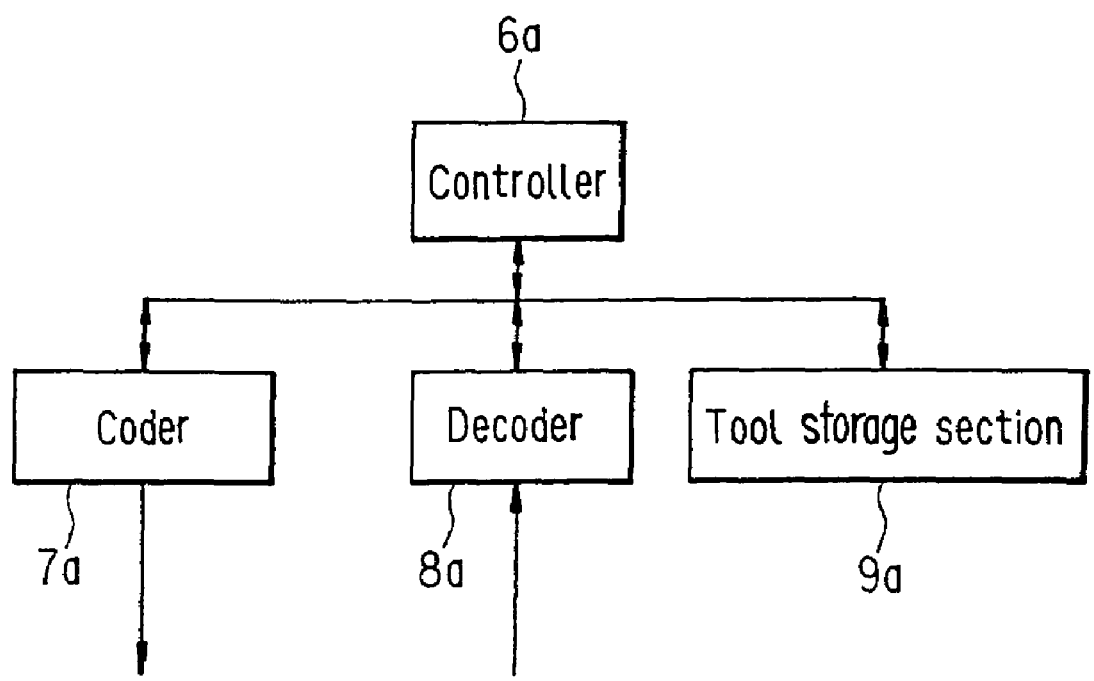
FIG. 1C is a block diagram showing a conventional coding and decoding apparatus.
Figure 3:
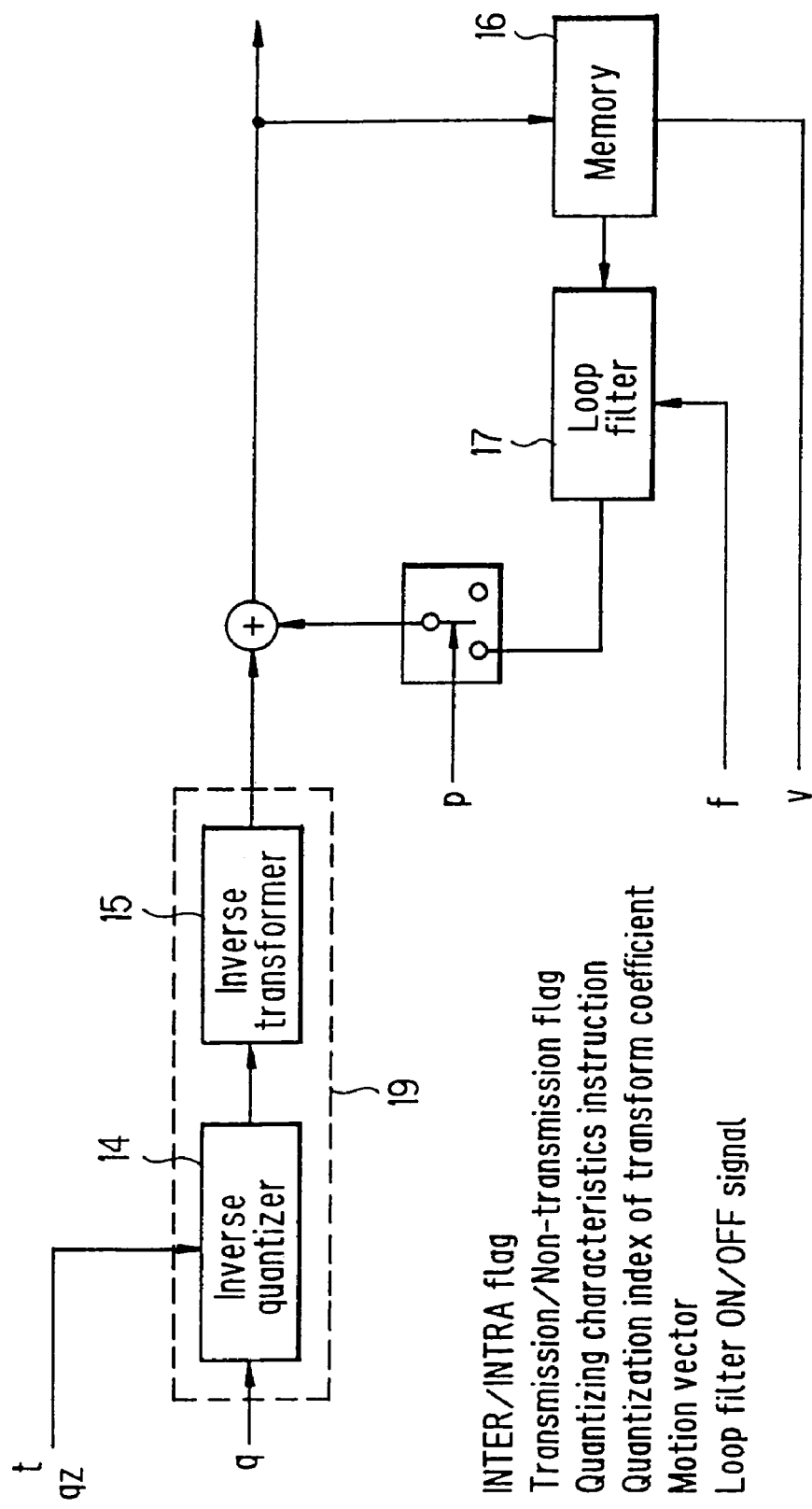
FIG. 3 is a block diagram showing the configuration of decoder based on H.261.
Figure 4:
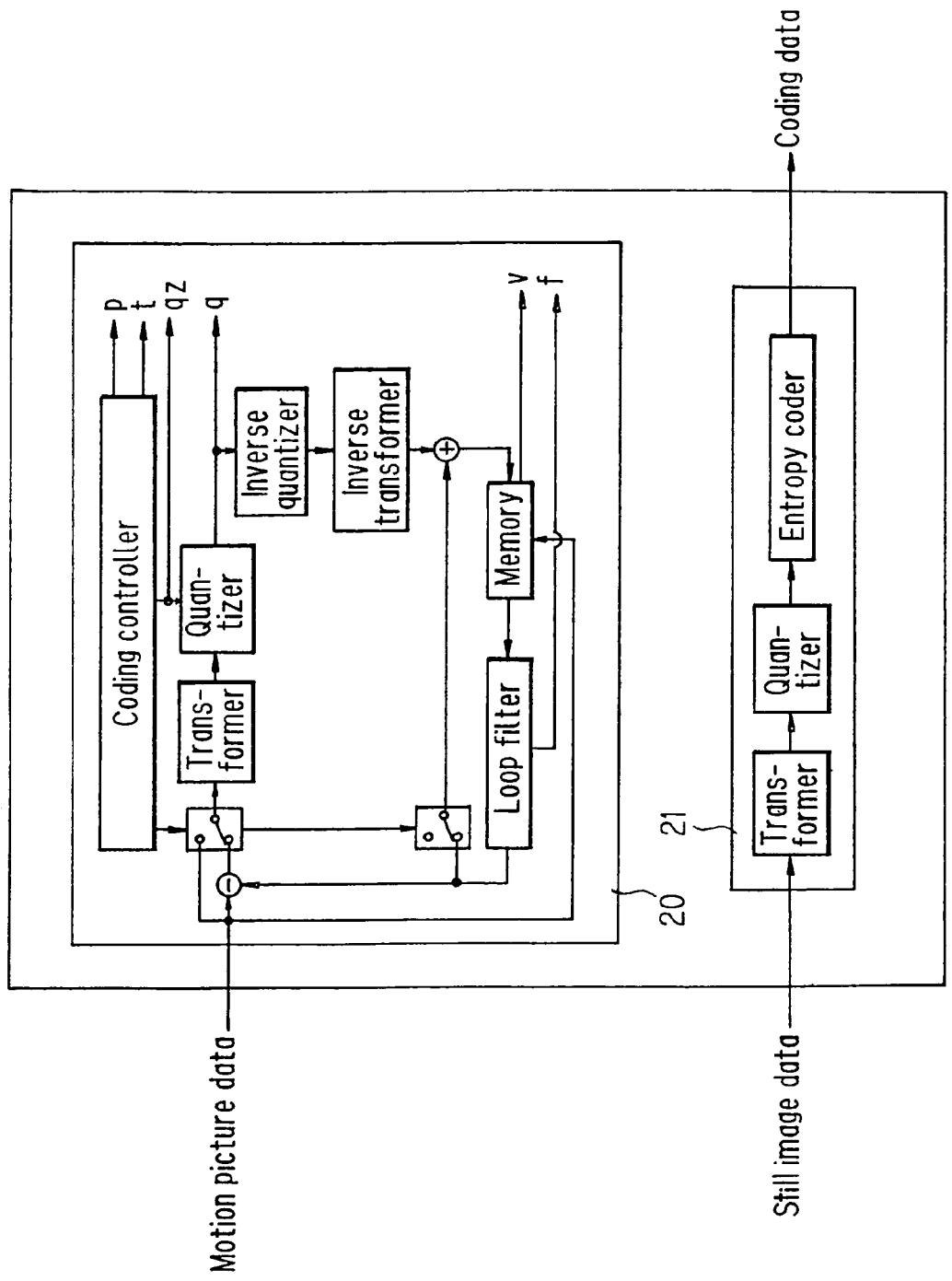
FIG. 4 is a block diagram showing the structure of a coder which is provided with several kinds of algorithms.
Figure 5:
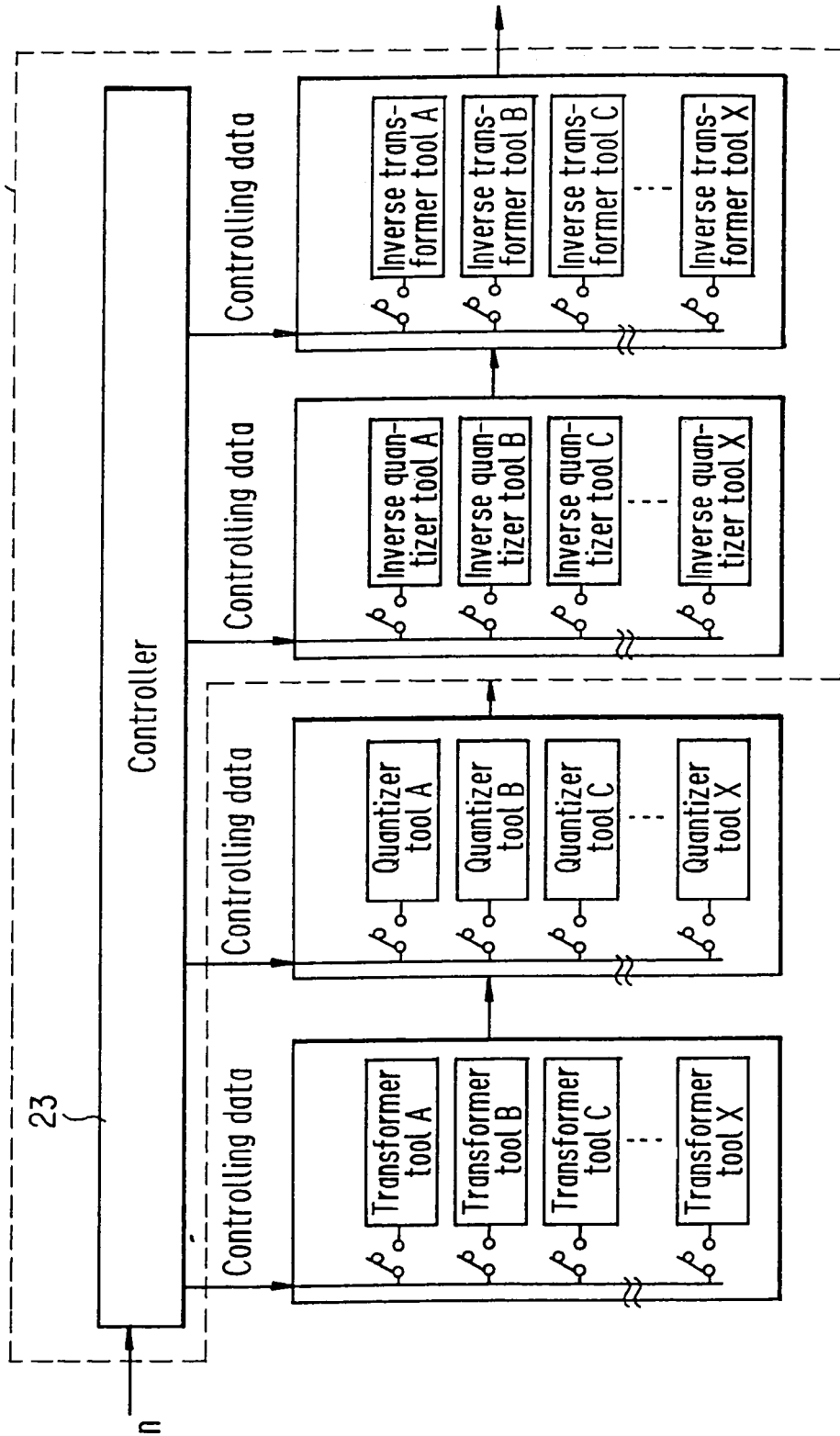
FIG. 5 is a block diagram showing the structure of a decoder which is realized by using a dedicated hardware device with software.
Figure 6:
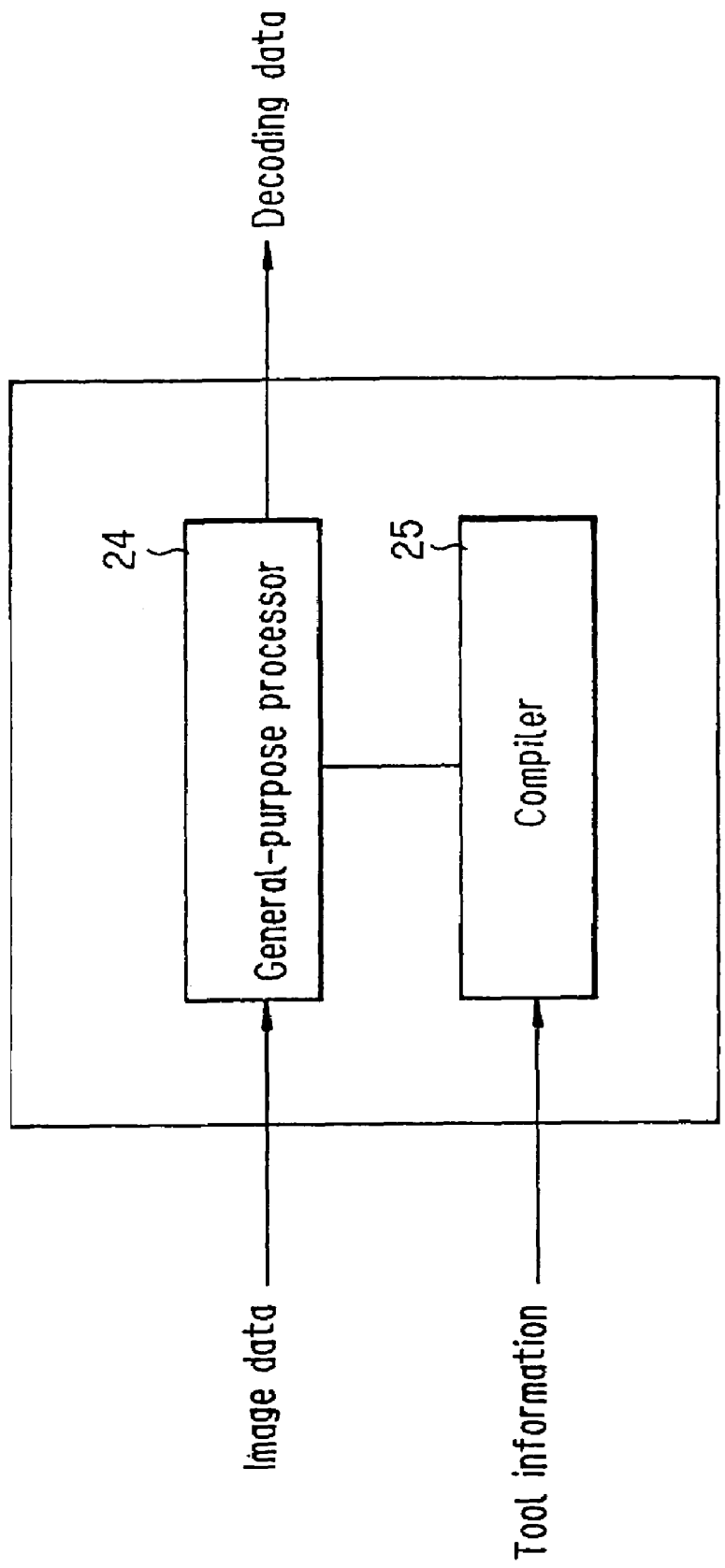
FIG. 6 is a block diagram showing the structure of a decoder composed of a general-purpose processor and a compiler.
Figure 7C:
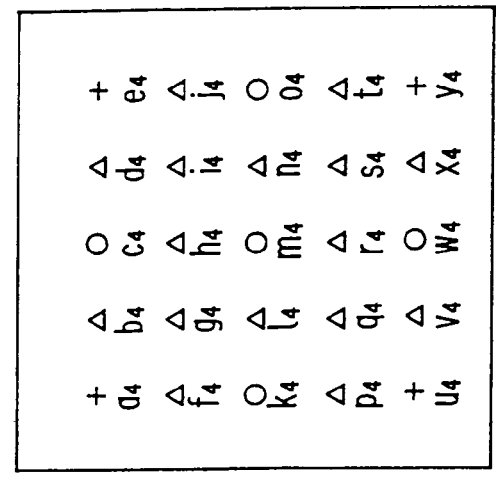
FIG. 7C is a diagram showing an arrangement of pixel data obtained by means of an frame predictive coding tool of sampling per ¼ pixel.
Figure 7B:
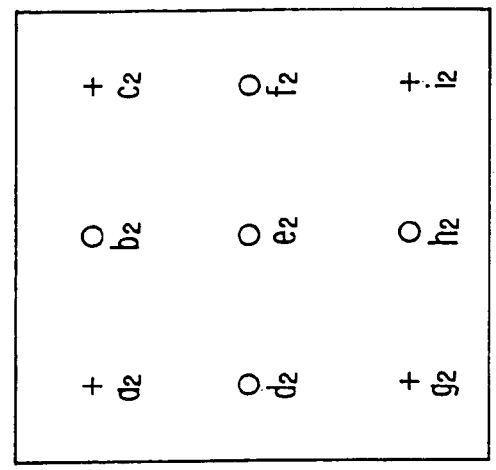
FIG. 7B is a diagram showing an arrangement of pixel data obtained by means of an frame predictive coding tool of sampling per ½ pixel.
Figure 7A:
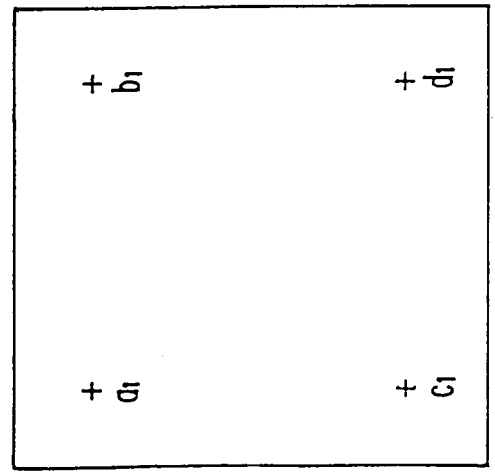
FIG. 7A is a diagram showing an arrangement of pixel data obtained by means of an frame predictive coding tool of sampling per single pixel.
Figure 8A:
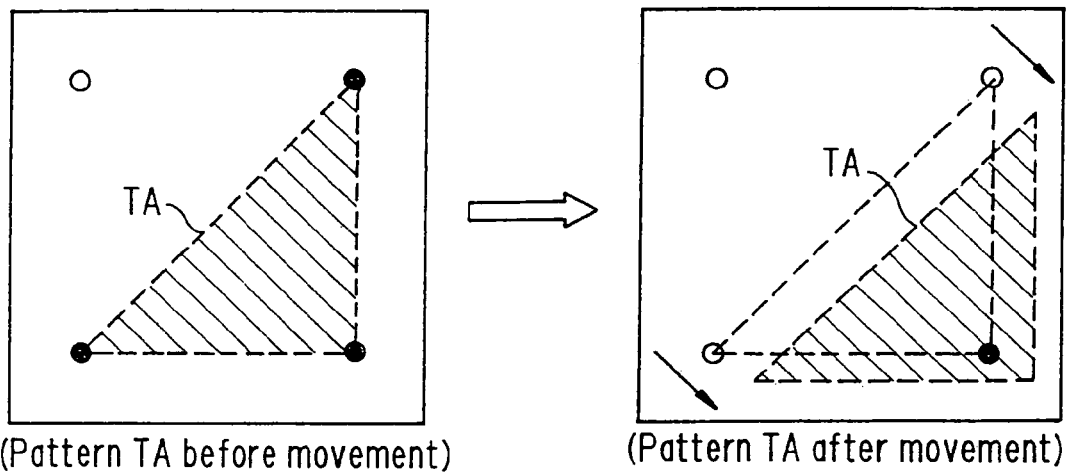
FIG. 8A is a diagram showing display images of a pattern TA obtained by decoding coded data based on the frame predictive coding of sampling per single pixel.
Figure 8B:
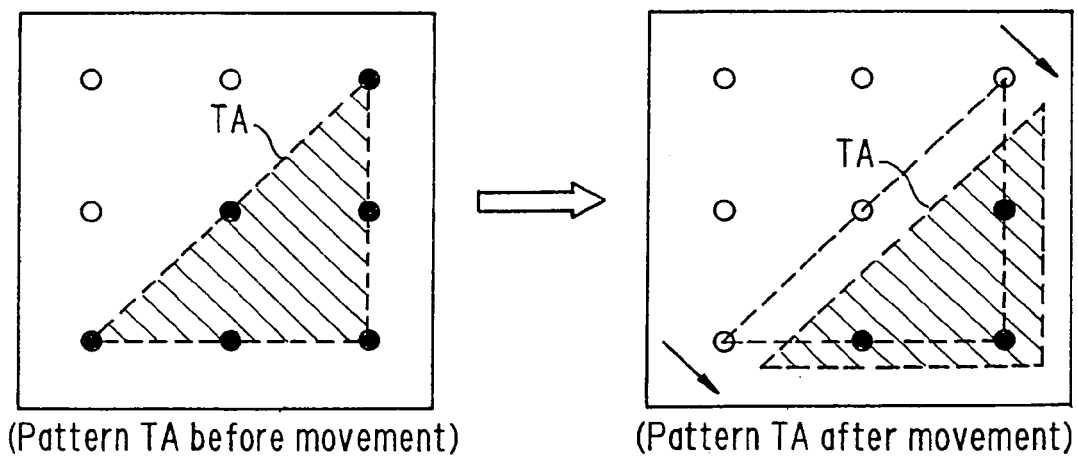
FIG. 8B is a diagram showing display images of a pattern TA obtained by decoding coded data based on the frame predictive coding of sampling per ½ pixel.
Figure 8C:
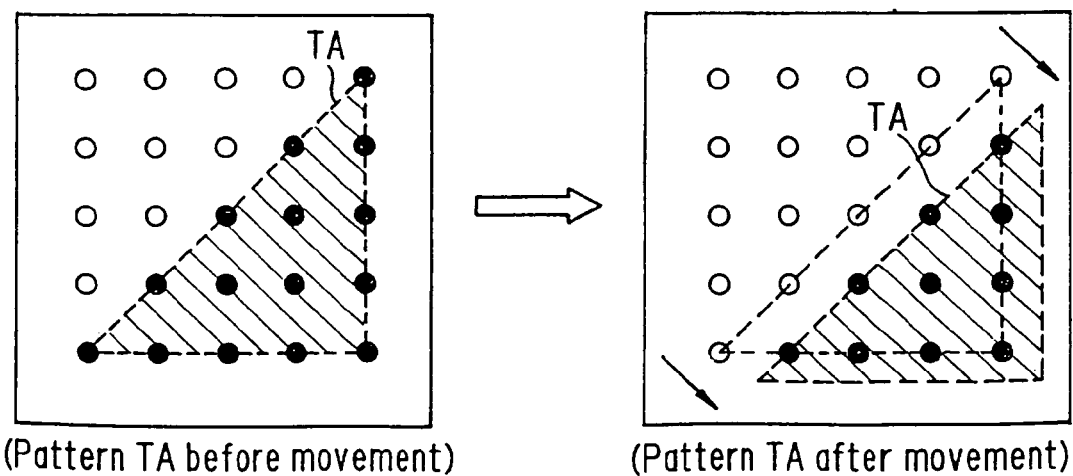
FIG. 8C is a diagram showing display images of a pattern TA obtained by decoding coded data based on the frame predictive coding of sampling per ¼ pixel.
Figure 19:
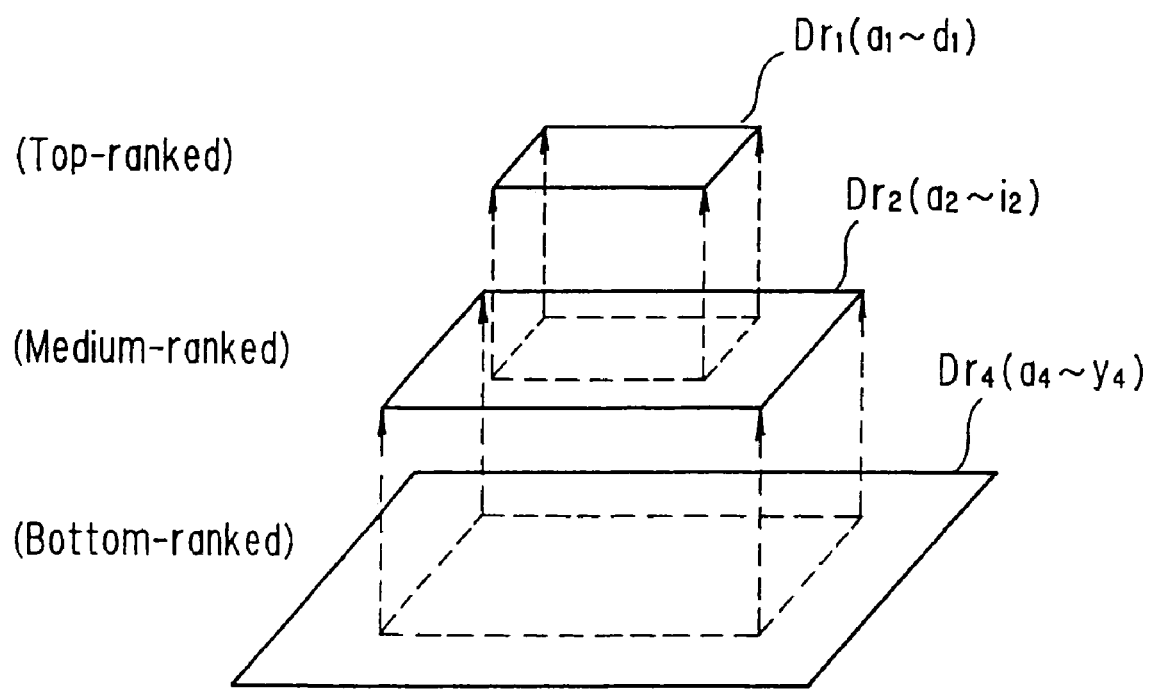
FIG. 19 is a conceptual view for explaining a hierarchical structure of a coded data obtained using an frame predictive coding tool of sampling per ¼ pixel.

FIG. 19 is a conceptual view for explaining the hierarchical structure of the coded data obtained using the frame predictive coding tool of sampling per ¼ pixel. In the figure, top-rank coded data $D_{r1}$, medium-ranked coded data $D_{r2}$, and bottom-ranked coded data $D_{r4}$ are produced by the aforementioned top-ranked, medium-ranked and bottom-ranked frame predictive coding tools, respectively. Pixel data $a_1$, to $d_1$, $a_2$ to $i_2$, and $a_4$ to $y_4$ shown in FIG. 7C correspond to top-ranked coded data $D_{r1}$, medium-ranked coded data $D_{r2}$ and bottom-ranked coded data $D_{r4}$, respectively. As understood from FIG. 19 and FIGS. 7A to 7C, the bottom-rank coded data has such a data structure that it hierarchically includes the medium and top-ranked coded data. The medium-ranked coded data has such a data structure that it hierarchically includes the top-ranked coded data.

The hierarchization of coded data by the inter-frame predictive coding process is obtained by noticing the hierarchical structure of the coded data as stated above. That is, coding apparatus 102 selectively adds a header (identifiers) for identifying the rank of data, to each piece of pixel data $a_4$ to $y_4$ constituting coded data $D_{r4}$ of the bottom rank, so that the coded data whose rank is defined in correspondence with the coding capacity of the inter-frame predictive coding tool used is created.

Figure 20:
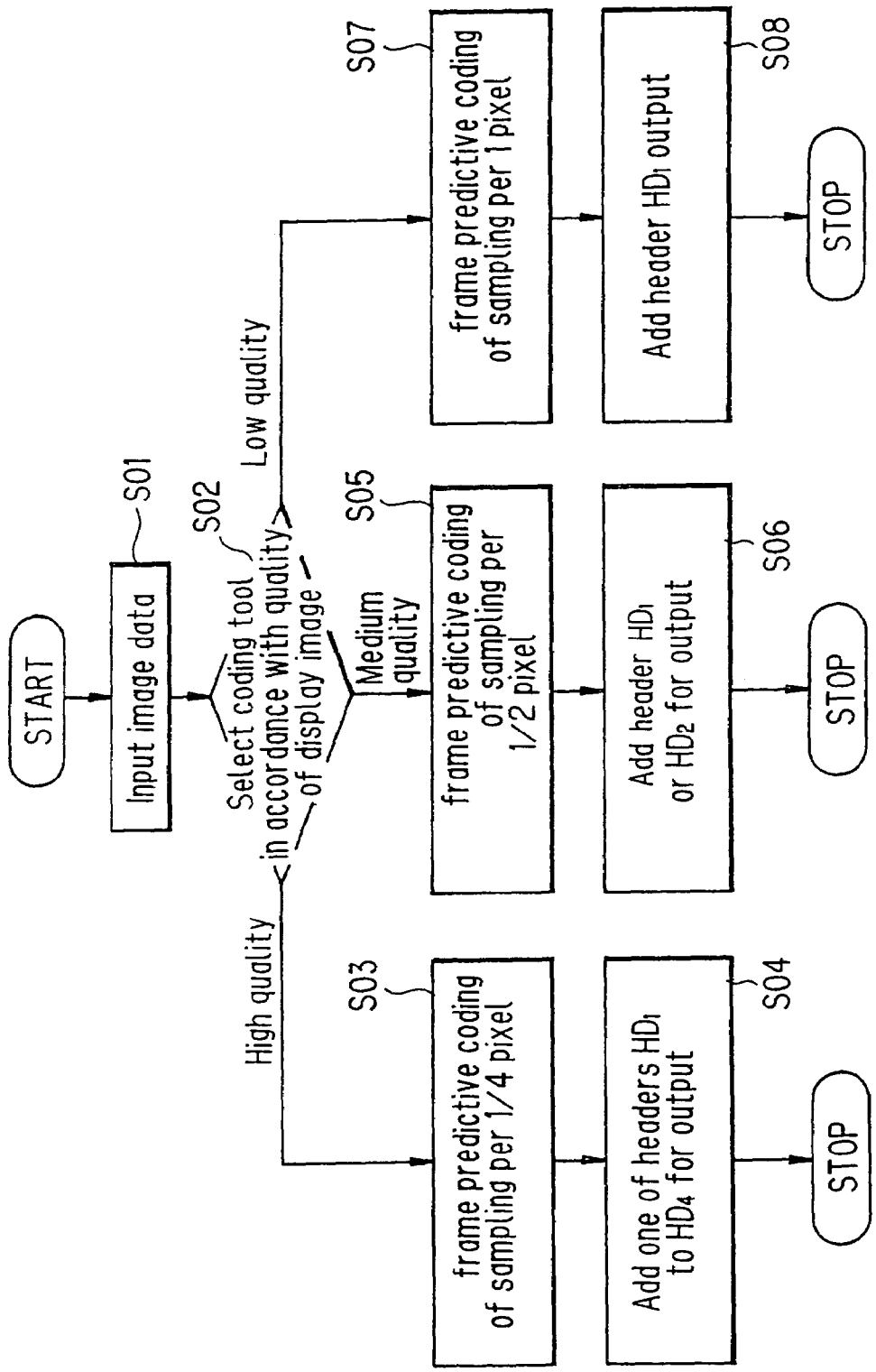
FIG. 20 is an operational flowchart for explaining the operation of frame predictive coder.

Now, the operation of inter-frame predictive coder 123 will be described in detail with reference to the flowchart shown in FIG. 20. First, frame predictive coder 123 inputs image data from quantizer 122 (Step S01), and then it selects an frame predictive coding tool in accordance with the quality of display image on the decoding side (Step S02). Since, in frame predictive coder 123, frame predictive tool $EC_4$ of sampling per ¼ pixel (the frame predictive tool for the bottom rank) which provides high-quality image display has been selected as already mentioned, the image data is subjected to the frame predictive coding process by means of frame predictive coding tool $EC_4$ (Step S03). Each piece of image data $a_4$ to $y_4$ thus obtained is added with one of headers $HD_1$, to $HD_4$ which corresponds to the rank of the frame predictive coding tool (Step S04). Thus, coded data $D_{r4}$ of the bottom rank is produced. Then, as the coded data $D_{r4}$ is outputted to transmitter 103, the operation is ended.

In the above Step S02, when the high-quality display image is not requested, the frame predictive coding process is performed by using the inter-frame predictive coding tool of sampling per ½ pixel or single pixel (Step S05 or S07). Thereafter, the thus obtained coded data is added with corresponding headers (Step S06 or S08).

Now, headers $HD_1$ to $HD_4$ will be explained. FIGS. 21A and 21B are diagrams showing the data structures of bottom-ranked coded data $D_{r4}$ where each piece of coded data is added with any of headers $HD_1$, to $HD_4$ which corresponds to the rank of the frame predictive coding tool. More specifically, there figures show the data structures wherein, from pixel data $a_4$ to $y_4$ shown in FIG. 7C, each piece of pixel data $a_4$ to $j_4$ arranged on the first and second lines is added with one of headers $HD_1$, to $HD_4$. In FIG. 21A, header $HD_1$ is attached to the pixel data (the pixel data of the pixels indicated by '+' in FIG. 7C) corresponding to the data which is produced by the inter-frame predictive coding of sampling per single pixel. Next, header $HD_2$ is attached to the pixel data (the pixel data of the pixels indicated by 'o' in FIG. 7C) corresponding to all the data which is produced by the frame predictive coding of sampling per ½ pixel, except the pixel data produced by the frame predictive coding of sampling per single pixel. Further, head $HD_4$ is attached to the pixel data (the pixel data of the pixels indicated by 'Δ' in FIG. 7C) corresponding to all the data which is produced by the frame predictive coding of sampling per ¼ pixel, except the pixel data produced by the frame predictive coding of sampling per ½ pixel.

In this way, which each piece of pixel data constituting coded data $D_{r4}$ is attached with the header corresponding to the rank of the inter-frame predictive coding tool, the set of pixel data added with header $HD_1$, becomes equal to the content of the coded data which is obtained by frame predictive coding tool $EC_1$, of the top rank. The set of pixel data added with header $HD_1$, or $HD_2$ becomes equal to the content of the coded data which is obtained by inter-frame predictive coding tool $EC_2$ of the medium rank. Therefore, on the decoding side, pixel data $a_1$, to $d_1$, $a_2$ to $i_2$ and $a_4$ to $y_4$ which correspond to respective inter-frame predictive coding tools of different ranks, among coded data $D_{r4}$ can be discriminated by identifying the class of headers attached to pixel data $a_4$ to $y_4$ constituting coded data $D_{r4}$. Further, it is possible to identify the coding tools used for producing coded $D_{r4}$ by examining the classes of the headers. In this way, coded data $D_{r4}$ of the bottom rank which is constituted by the pixel data stream with headers attached is sent out onto communication net 300 by means of transmitter 103.

As shown in FIG. 21B, when a series of pixel data is added with the same headers, the headers may be attached to only the leading part of the pixel data. This attachment of headers will inhibit the increase of the amount of data due to the addition of headers.

Next, the operation of receiving system 2a will be described. Receiver 201 as the input interface of receiving system 2a picks up coded data $D_{r4}$ from communication net 300 and supplies it to decoding apparatus 202. Coded data $D_{r4}$ taken in to decoding apparatus 202 is decoded in inter-frame predictive decoder 221 to be converted into image data. The thus obtained image data after the conversion is further converted into a video signal through inverse quantizer 222 and inverse transformer 223. Video output unit 203 develops the video signal into a visual image as video information on the monitor. Here, frame predictive decoder 221 has only frame predictive decoding tool $DC_2$ of sampling per ½ pixel which has the decoding capacity corresponding to coding capacity of inter-frame predictive coding tool $EC_2$. This frame predictive decoding tool $DC_2$ is defined as a tool of the medium rank.

The operation of frame predictive decoder 221 will hereinbelow be described in detail with reference to the operational flowchart shown in FIG. 22. Frame predictive decoder 221 receives coded data $D_{r4}$ from receiver 201 (Step S11). Then, it is judged whether the rank (coding capacity) of the coding tool of the frame predictive coding tool used in coding is equal to the rank (decoding capacity) of frame predictive decoding tool $DC_2$ equipped in frame predictive decoder 221 (Step S12). This judgment can be made by identifying header $HD_4$ among headers HD1 to HD4 attached to the coded data. Since input coded data $D_{r4}$ is of the bottom rank, the rank of the input coded data is determined not to be identical with the rank (medium rank) of decoding tool $DC_2$ equipped in frame predictive decoder 221 (Step S12, No).

Next, it is judged whether the rank of coding tool $EC_4$ (bottom-ranked) which has been used to produce coded data $D_{r4}$ is lower than the rank of decoding tool $DC_2$ (medium-ranked) equipped in frame predictive decoder 221 (Step S15). In this judgment, if it is on the lower side (Step S15, Yes), only the pixel data which has been coded with headers $HD_1$ and $HD_2$ which conform with the decoding capacity of frame predictive decoding tool $DC_2$ of the medium rank, is extracted from coded data $D_{r4}$ to reconstruct coded data (Step S16).

Specifically, from pixel data $a_4$ to $y_4$ obtained by the frame predictive coding process of sampling per ¼ pixel, the pixel data which corresponds to the coded data obtained by the frame predictive coding of sampling per ½ pixel is picked up to reconstruct coded data (Step S16). The extraction of data is performed by identifying the header added to each piece of pixel data so that the pixel data added with header $HD_1$ or $HD_2$ is extracted from pixel data $a_4$ to $y_4$. Then, the headers are removed from thus extracted data, whereby coded data $D_{r4}$ is reconstructed into coded data $D_{r2}$. Coded data $D_{r2}$ thus reconstructed is made to undergo the frame predictive decoding by using tool $DC_2$ of the medium rank (Step S17).

Suppose that frame predictive decoder 221 has unillustrated frame predictive decoding tool $DC_4$ of sampling per ¼ pixel. In this case, it is determined in the judgment at Step S12 that the rank of decoding tool equipped on the decoding side is the same as that of the coding tool (Step S12, Yes), and headers $HD_1$ to $HD_4$ are removed from coded data $D_{r4}$, whereby coded data $D_{r4}$ without headers is reconstructed (Step S13). Then, frame predictive decoding tool $DC_{r4}$ is used to cause reconstructed coded data $D_{r4}$ to undergo to the inter-frame predictive decoding process. The image data obtained from this decoding process is outputted to inverse quantizer 222 (Step S14), and thus the decoding operation is ended.

Further, if the inter-frame predictive coding is executed using frame predictive coding tool $EC_1$ of sampling per single pixel, the received coded data must be coded data $D_{r1}$ which belongs to the higher rank. Therefore, in the above judgment at Step S15, the rank of the coding tool is determined not to be on the lower side (Step S15, No). In this case, since coded data $D_{r2}$ which conforms with frame predictive decoding tool $DC_2$ equipped in the decoding side can not be reconstructed from coded data $D_{r1}$ which is received, the operation is ended without executing the decoding process.

As has been apparent from the foregoing description, in accordance with the coding and decoding apparatus of the third embodiment, n-ranked coded data which is produced using an n-ranked coding tool and decoded using an n-ranked decoding tool has a hierarchical structure which includes (n+1)-ranked coded data which is produced using a (n+1)-ranked coding tool and decoded using a (n+1)-ranked decoding tool. This inclusionary relation holds for an arbitrary positive integer n.

On the coding side which has the n-ranked coding tool, the coder produces the n-ranked coded data using the n-ranked coding tool. The identifier adder attaches N-ranked identifiers to N-ranked coded data which is included in the n-ranked coded data but is other than (N+1)-ranked coded data included in the N-ranked coded data. In this case, N is a positive integer which is equal to n or more and whose upper boundary is limited depending upon the depth of the hierarchy of the coded data. As a result, if n=1, for example, then first-ranked identifiers are attached to first-ranked coded data except for second-ranked coded data included in the first-ranked coded data. The second-ranked identifiers are attached to the second-ranked coded data included in the first-ranked coded data except for the third-ranked coded data included in the second-ranked coded data. Similarly, the fourth or fifth-ranked identifiers are attached to the data in accordance with the depth of the hierarchy of the coded data included in the first-ranked coded data.

Next, on the decoding side which has a m-ranked decoding tool (m is a positive integer satisfying m>n), the data reconstructer extracts a set of the N-ranked coded data which is included in the n-ranked coded data and attached with the N-ranked identifiers where N≦m. By this extraction, if n=1, m=2, for example, second-ranked coded data included in first-ranked coded data (a set of the coded data with second, third-ranked, . . . identifiers attached) will be extracted. If n=1, m=3, as another example, third-ranked coded data included in the first coded data (a set of the coded data with third, fourth-ranked, . . . identifiers attached) will be extracted. From the thus extracted set of the N-ranked coded data with N-ranked identifiers attached, the m-ranked coded data is reconstructed. Then, the decoder decodes the m-ranked coded data using the m-ranked decoding tool. Here, it is possible to perform the coding and decoding operations using an frame predictive coding tool for the coding tool and an frame predictive decoding tool for the decoding tool.

As stated above, since the coding and decoding tools are defined by hierarchization, and the data which conforms to the processing capacities of the thus hierarchized tools is attached with headers for identifying the processing capacity of the tool on the coding side, the data can be reconstructed so as to have a data structure which conforms to the processing capacity of the decoding side and can be decoded. As a result, even if the processing capacities of the coding and decoding tools are not compatible, it is possible to decode the coded data.

It becomes no more necessary for the decoding side to have all of various tools in order to deal with the data which is coded by such an algorithm having various coding and decoding tools as a next-generation coding standard represented by MPEG4. Therefore, it is possible to reduce the cost of the apparatus.

Further, since it is possible to alleviate the restriction on the hardware of the decoding apparatus, it becomes possible for a simple low-cost apparatus to decode the data coded based on the next-generation coding standard.

Fourth Eembodiment

The fourth embodiment of the invention will be described hereinbelow with reference to drawings.

Figure 23:
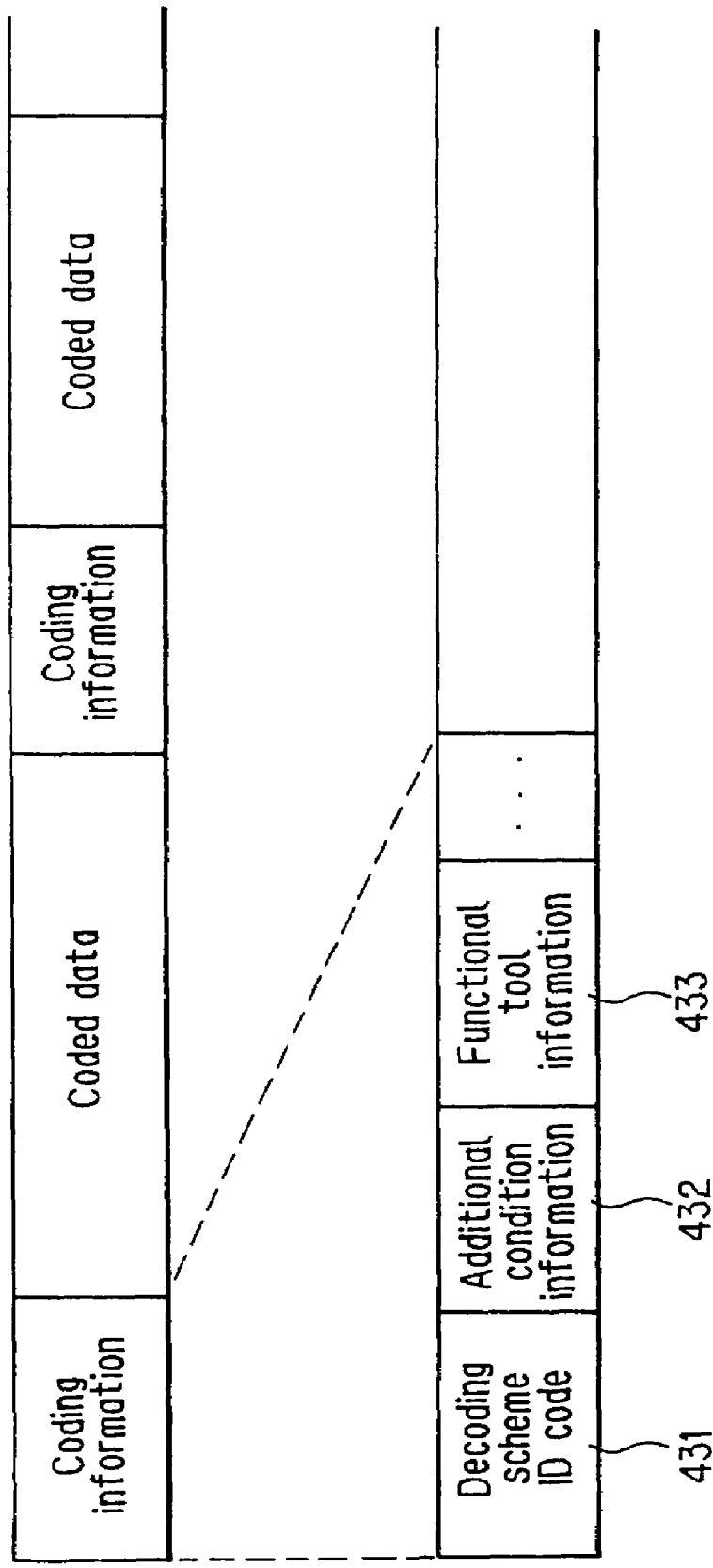
FIG. 23 is a diagram showing the structure of a coding data stream using a decoding scheme identification code and differential information in accordance with the fourth embodiment.

FIG. 23 is a diagram showing an example of the structure of a coding data stream used in the coding and decoding apparatus of the invention.

Figure 9:
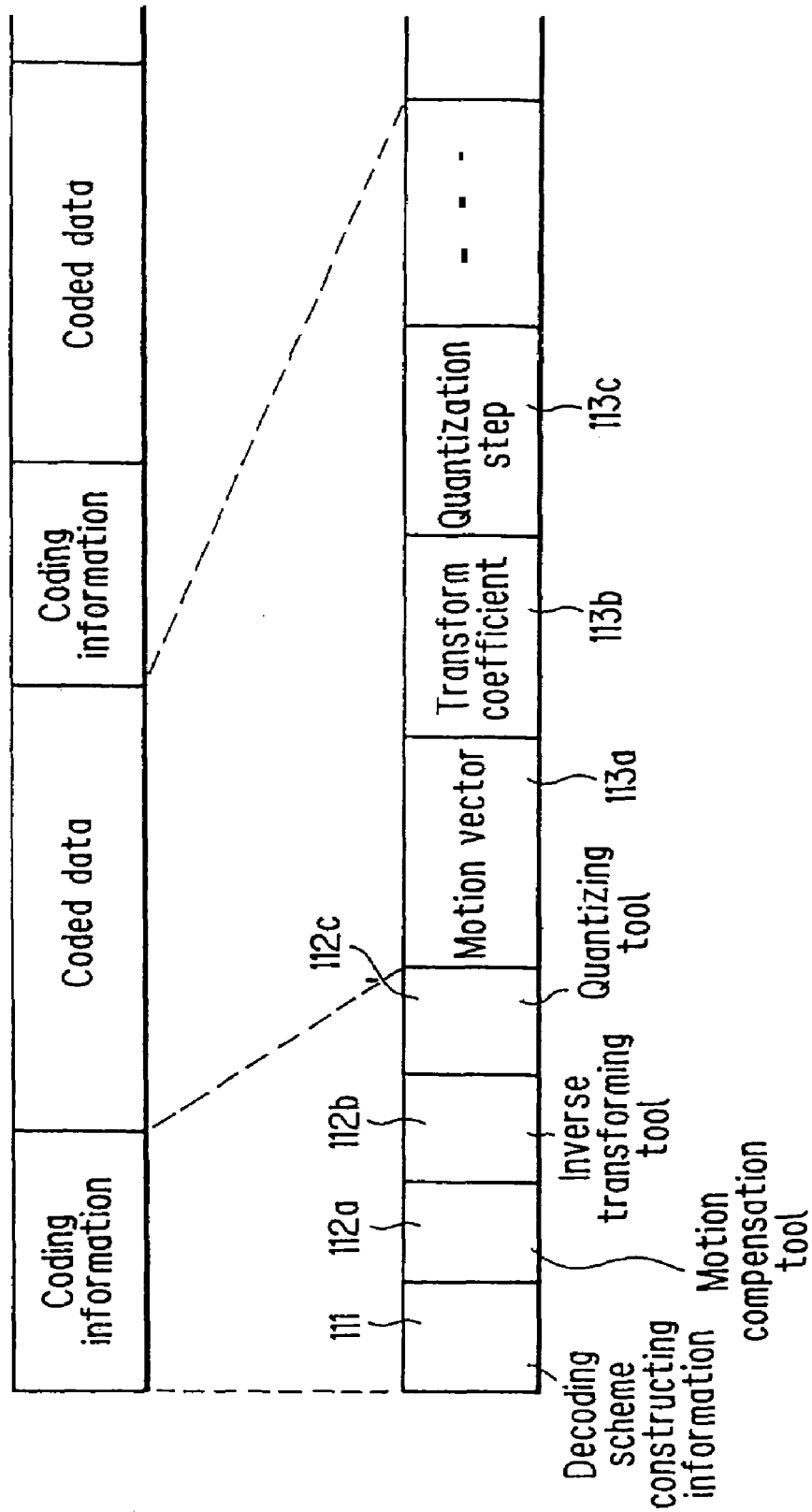
FIG. 9 is a structural diagram showing a coding data stream which has coding information.
Figure 10:
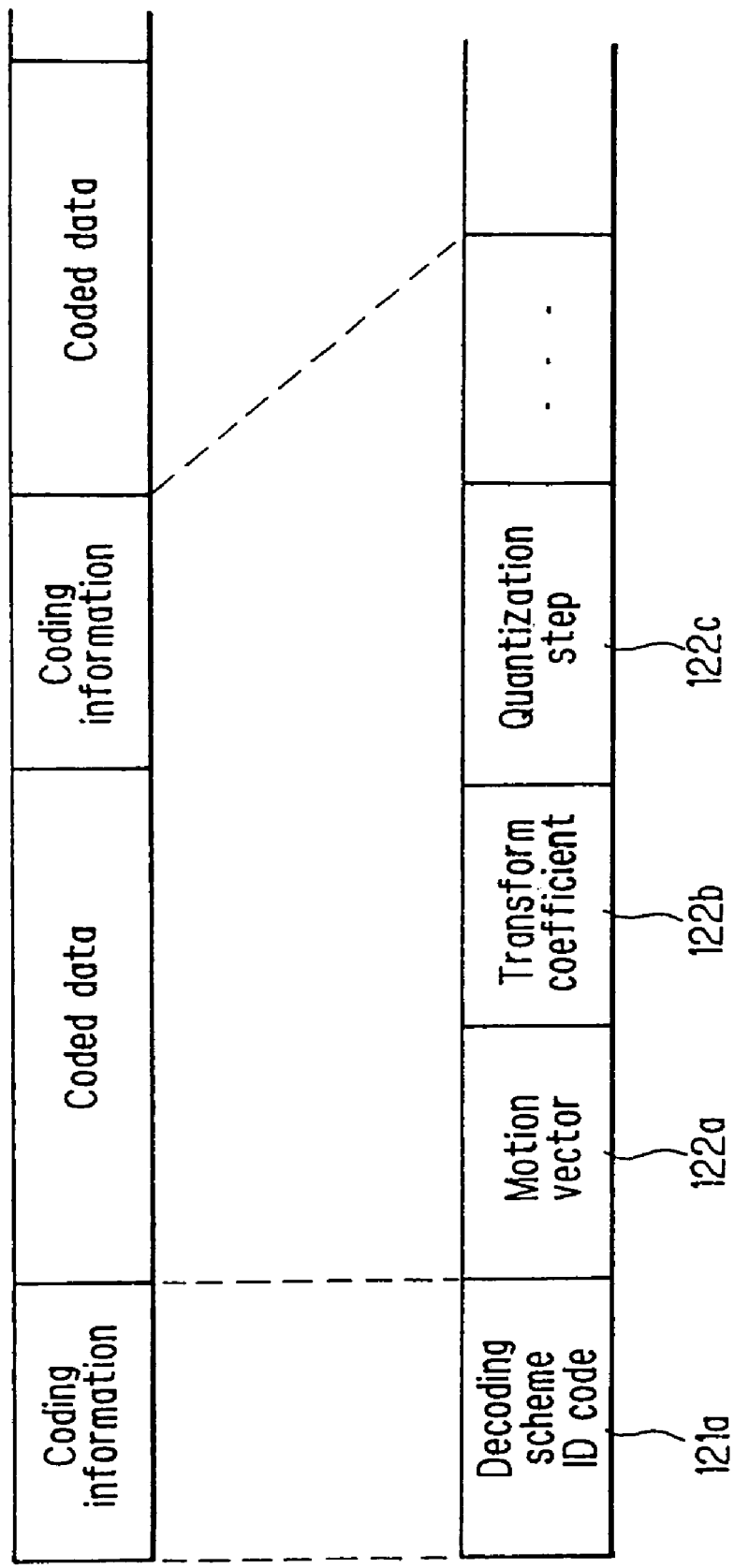
FIG. 10 is a structural diagram showing a coding data stream which uses a decoding scheme identification code for coding information.

In FIG. 23, a decoding scheme identification code 431 as a component of the coding information is the same as that of FIG. 10, and is an identification code for a previously defined basic decoding scheme. Additional condition information 432 and tool information 433 are instructional information for adding, deleting or replacing certain procedures for the basic decoding scheme identification code 431. That is, when, for example, the coding scheme which, although it basically conforms to H.261, is partially modified at minute points is used, only the decoding scheme identification code of H.261 with the differential information from the scheme is transmitted as the coding information in order to enable the reconstruction of the decoding scheme on the decoding side. In this way, it is possible to eliminate the loss of transmitting all the functional tool information as shown in FIG. 9.

As stated above, the additional condition information may include specifying conditions such as addition, deletion and replacement, etc. For example, the transaction of motion compensation used in the H.261 coding scheme to efficiently display the movement of objects, tends to lower the speed of processing since a lot of operations are needed on the coding side. In order to avoid such a situation, it is possible not to use the motion compensation. In such a case, the additional condition information can be provided with an instruction of deleting a functional tool while the functional tool information can be provided with the identification code of the motion compensating tool. In this way, it is possible to drastically reduce the transmitted amount of data compared to the case where the revised coding information based on H.261 which does not have the motion compensating is transmitted from the beginning.

Similarly, other instructions such as addition of a functional tool which is not included in the basic decoding scheme or replacement of a functional tool with another functional tool which has a similar function, can be made by the combination of the additional condition information and the functional tool information. Thus, it is possible to reduce the transmitted amount of data compared to the case where all the information which constitutes the decoding scheme is transmitted from the beginning.

Now, the configurations of the coding apparatus and the decoding apparatus for practicing the above operations will be described hereinbelow.

Figure 24:
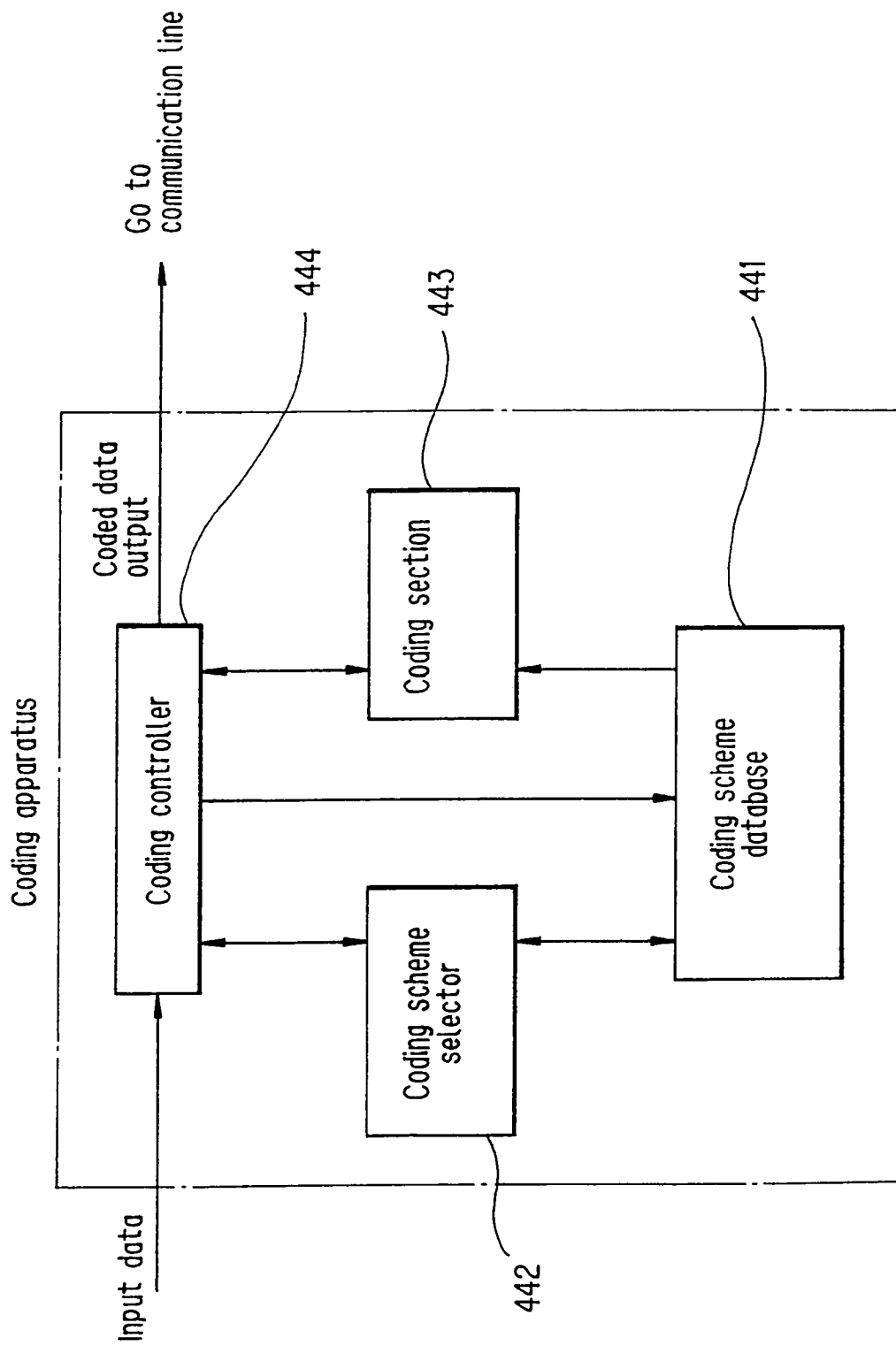
FIG. 24 is a structural diagram showing an example of the coding apparatus of the fourth embodiment.

FIG. 24 is a block diagram showing an example of the embodiment of the coding apparatus having the function stated above. In FIG. 24, a reference numeral 441 designates a coding scheme database, which has basic coding schemes and a group of functional tools stored therein so that they can be read out from the outside. Designated at 442 is a coding scheme selector which selects the most preferable coding scheme in accordance with the nature of the input data, and reads out the components of a required coding scheme and the content of functional tools. The thus obtained coding scheme is transferred to a coding section 443 where the input data is sequentially coded. The control of the processing tools for the aforementioned sections as well as data input/output control etc., is performed altogether in a coding controller 444. If, in coding scheme selector 442, there are a number of selectable ways of coding information representing the determined scheme, the selector compares the transmitted amount of data between different selectable ways and selects the one whose transmitted amount of data is minimized and transmits it, in order to avoid the reduction in the efficiency in the use of the communication line as much as possible.

Figure 25:
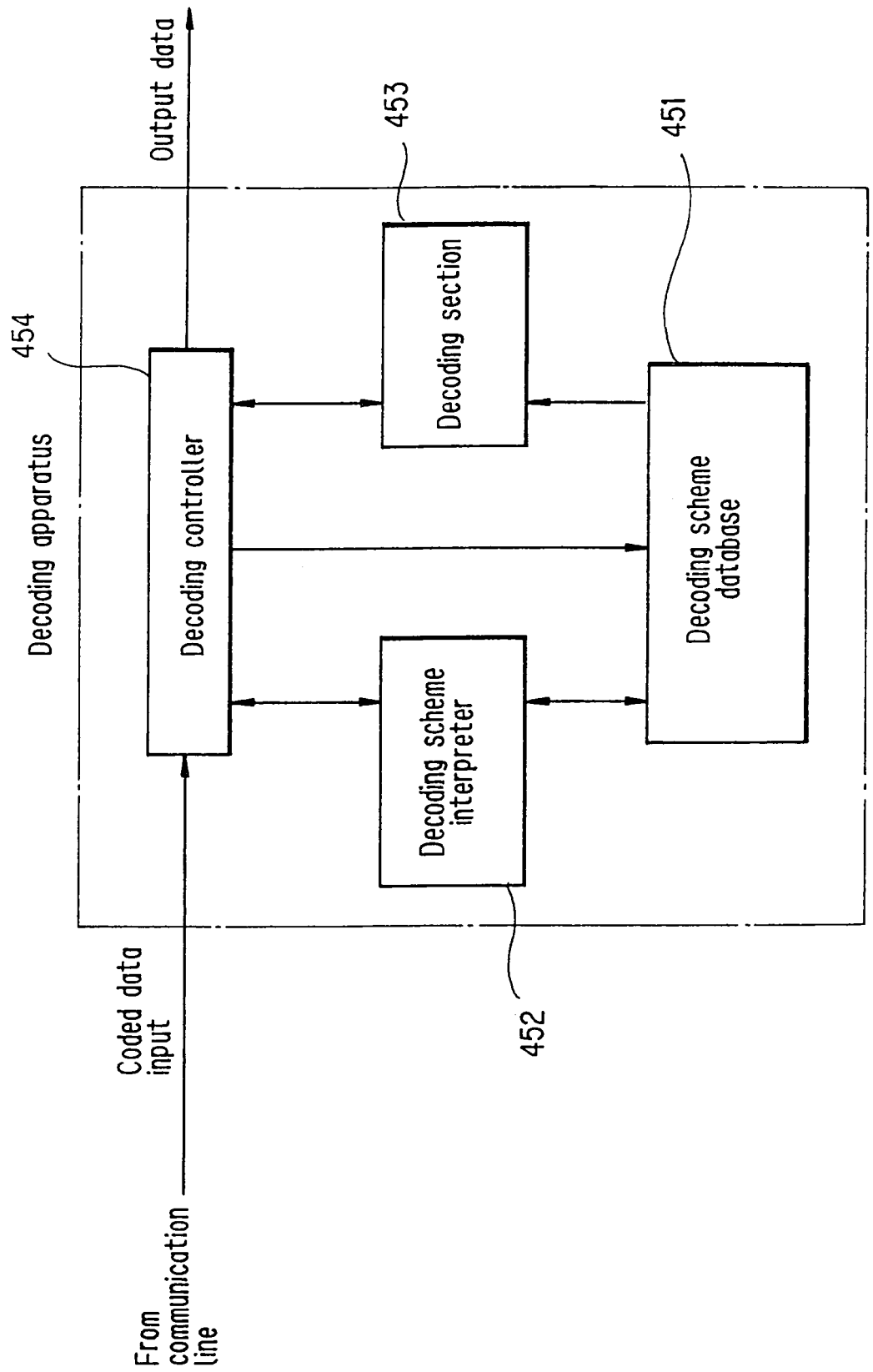
FIG. 25 is a structural diagram showing an example of the decoding apparatus of the fourth embodiment.

FIG. 25 is a block diagram showing an example of the embodiment of the decoding apparatus having the function described above. In FIG. 25, a reference numeral 451 designates a decoding scheme database, which has basic coding schemes and a group of functional tools stored therein so that they can be read out from the outside. Designated at 452 is a decoding scheme interpreter which reads out the components of a required decoding scheme and the content of functional tools from decoding scheme database 451. The thus decoding scheme is transferred to a decoding section 453 where the input coded data is sequentially decoded. The control of the processing tools for the aforementioned sections as well as data input/output control etc., is performed altogether in a decoding controller 454.

As has been apparent from the foregoing description, the fourth embodiment of the invention offers the following advantages.

First, since when the coding information is transmitted, an identification code of a previously defined basic decoding scheme and the differential information from the basic decoding scheme are transmitted, it is possible to reduce the transmitted amount of data compared to the case where the information of the functional tools for the decoding scheme and other information are all determined, and the efficiency in the use of the communication line will be prevented from being deteriorated very much.

Next, since when the coding information is transmitted, the information that one or some kinds of functional tools will be added to the basic decoding scheme is transmitted therewith as the differential information, the decoding scheme incorporated in the decoding apparatus can be expanded for use.

Since when the coding information is transmitted, the information that one or some kinds of functional tools will not be used is transmitted therewith as the differential information, the decoding scheme incorporated in the decoding apparatus can be simplified for use.

Further, since when the coding information is transmitted, the information that one or some kinds of functional tools will be replaced with another or others is transmitted therewith as the differential information, the decoding scheme incorporated in the decoding apparatus can be modified for use.

Finally, when the coding information is transmitted, if there are a number of combinations of selectable coding information, the amount of combined information is compared with the others so that the combination which minimizes the transmitted amount of information can be selected for transmission. Accordingly, it is possible to inhibit the efficiency in the use of the communication line from being degraded very much.

Fifth Embodiment

The fifth embodiment of the invention will be detailed with reference with drawings. For the description hereinbelow, the frame predictive coding and decoding method will explained as the illustrative configuration of a hierarchical coding and decoding tool. In the description, the method of sampling per single pixel, the method of sampling per ½ pixel and the method of sampling per ¼ pixel are assumed to be in the descending order from the top-rank.

Figure 26:
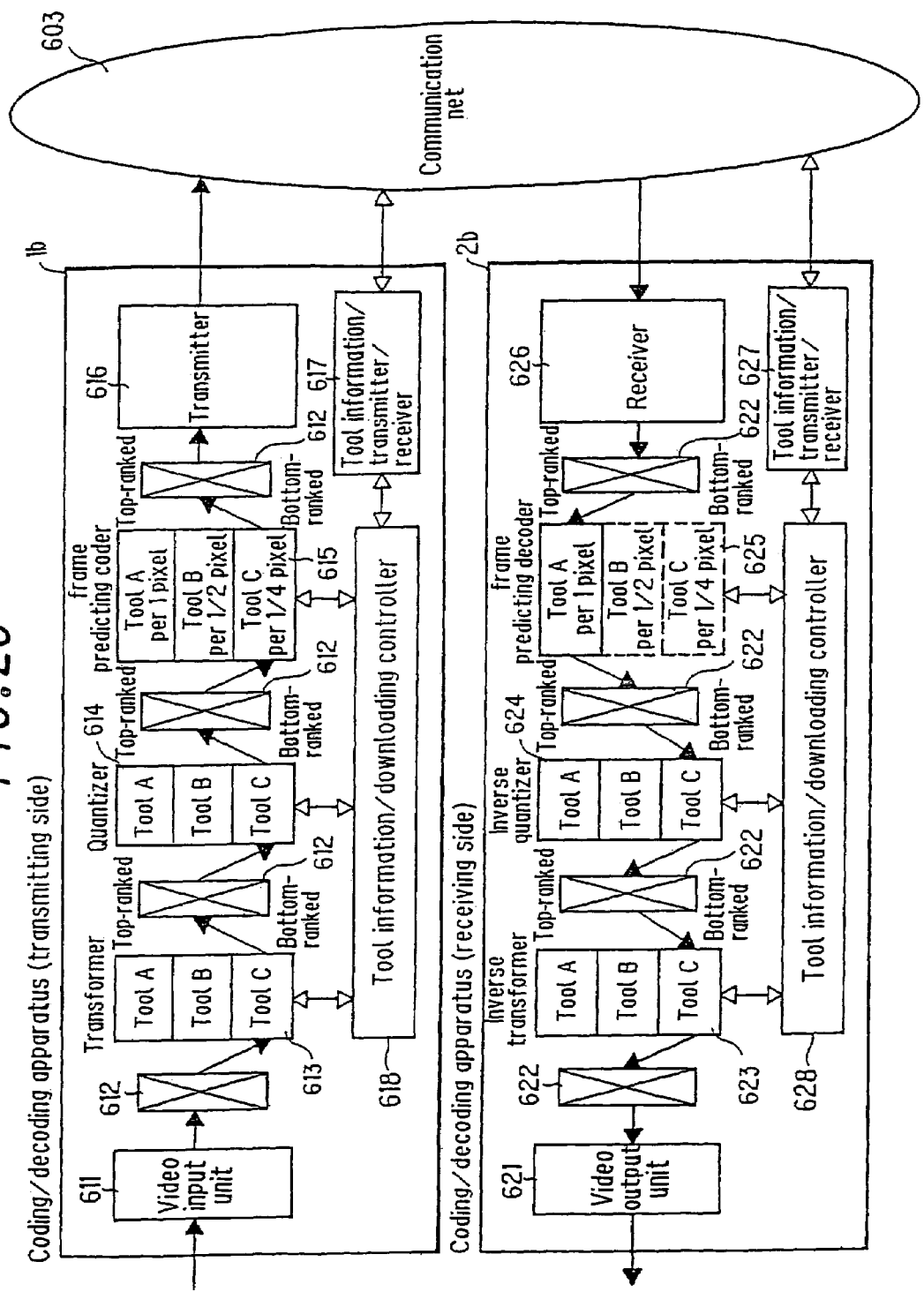
FIG. 26 is a structural diagram of a system showing the fifth embodiment of a coding and decoding apparatus of the invention.

FIG. 26 is a system block diagram showing an example of the fifth embodiment of the invention wherein 1b and 2b designate coding and decoding apparatuses and 603 a communication net. Coding and decoding apparatus 1b includes a video input unit 611, a switch 612, a transformer 613, a quantizer 614, an inter-frame predicting coder 615, a transmitter 616, a tool information transmitter/receiver 617 and a tool information/downloading controller 618. Coding and decoding apparatus 2b includes a video output unit 621, a switch 622, an inverse transformer 623, an inverse quantizer 624, an frame predicting decoder 625, a receiver 626, a tool information transmitter/receiver 627 and a tool information/downloading controller 628.

Figure 27:
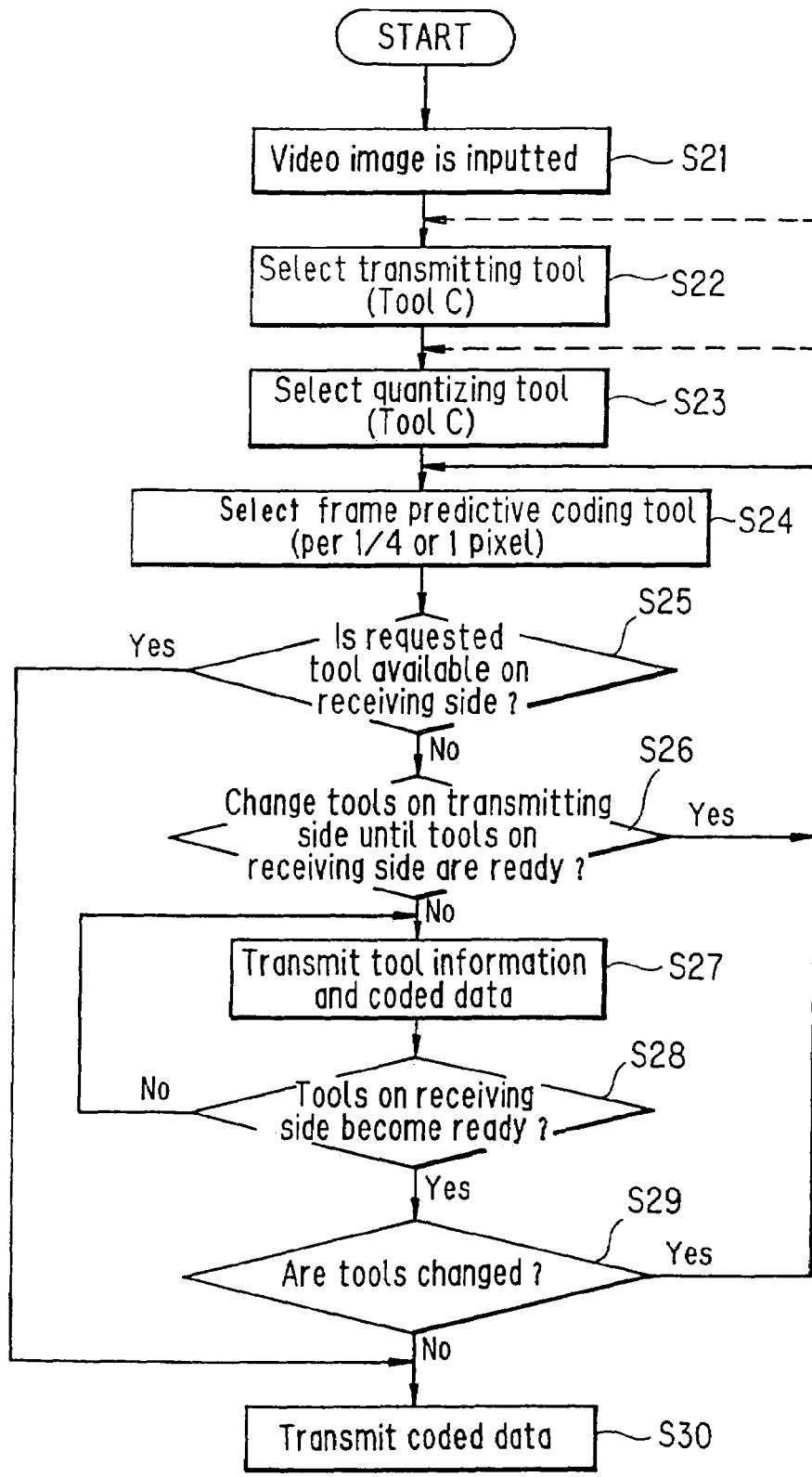
FIG. 27 is a flowchart for explaining the operation on the transmitting side in a coding and decoding apparatus of the fifth embodiment of the invention.
Figure 28:
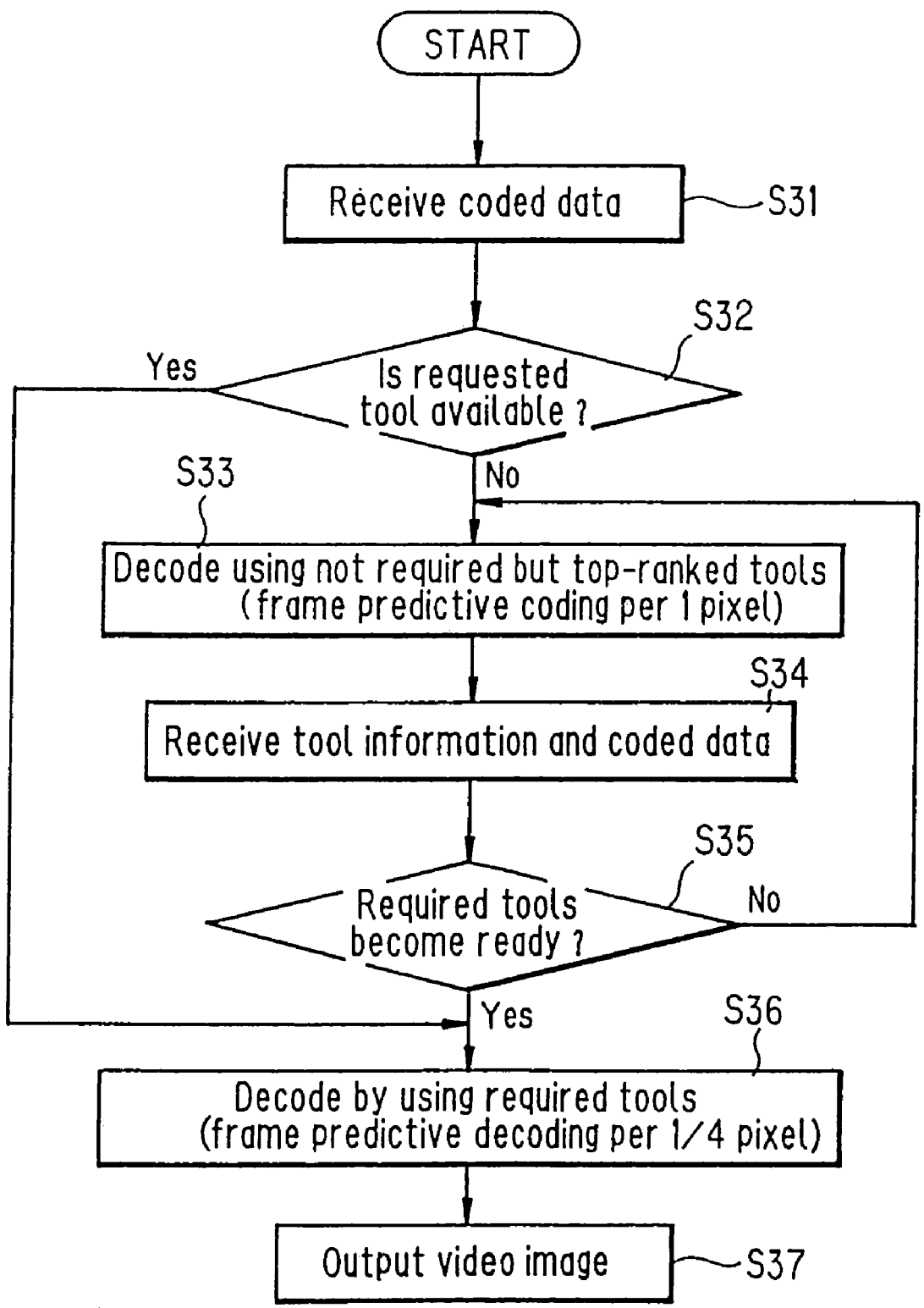
FIG. 28 is a flowchart for explaining the operation on the receiving side a coding and decoding apparatus of the fifth embodiment of the invention.

Now, description will be made of a case where an inputted video mage is transmitted through communication net 603 from coding and decoding apparatus 1b to coding and decoding apparatus 2b and the received signal is outputted. FIG. 27 is a flowchart of the operation in coding and decoding apparatus 1b. FIG. 28 is a flowchart of the operation in coding and decoding apparatus 2b.

When a video image is inputted to video input unit 611 in coding and decoding apparatus 1b (Step S21), the video signal is coded through transformer 613, quantizer 614 and frame predictive coder 615, each having a number of tools. Each of the tools are previously hierarchized in such a manner that the tools which are replaceable with the other tools are defined as bottom-ranked tools and the tools which cannot be replaced with the other tools are defined as top-ranked tools. In this embodiment, as shown in FIG. 26, the tools from the top-rank to the bottom-rank, are designated with A, B and C, for convenience. In this example, as shown in FIG. 26, the frame predictive coding tools are arranged so that the frame predictive coding tool of sampling per single pixel (tool A), the frame predictive coding tool of sampling per ½ pixel (tool B) and the frame predictive coding tool of sampling per ¼ pixel (tool C) are from the top to the bottom. Therefore, each of the tools in transformer 613, quantizer 614 and frame predicting coder 615 are selected through switch 612 in conformity with the quality of the coded video data to be transmitted from coding and decoding apparatus 1b.

In this embodiment, the frame predictive coding of sampling per ¼ pixel is categorized as the highest quality while the frame predictive coding of sampling per single pixel is categorized as the lowest quality.

In accordance with this example, first, tool C from each section is selected as the highest quality tool by switch 612 (Steps S22, S23 and S24). The inputted video image is processed through selected tools C, in particular, the signal is made to undergo the inter-frame coding tool of the tool of sampling per ¼ pixel. The thus processed signal is transmitted onto communication net 603 (Step S25). This coding information on communication net 603 is accepted by means of coding and decoding apparatus 2b. At that moment, coding and decoding apparatus 1b acquires the knowledge of the state of coding and decoding apparatus 2b from tool information transmitter/receptor 617 on the transmitting side and tool information transmitter/receiver 627 on the receiving side, and constructs the required tool information in tool information/downloading controller 618 (Step S26). The thus obtained tool information is sent out from tool information transmitter/receptor 617 whilst the coding information is transmitted from the transmitter 616 (Step S27).

At this point, until the tools in coding and decoding apparatus 2b become ready (Step S28), coding and decoding apparatus 1b may temporarily change its tools (Step S29) to transmit coded data (Step S30). Thus, since the transmitting side, in place of performing a heavy process using the tools for high quality requested, may perform a light-loaded process using the tools for low quality, and since the receiving side need not take the trouble to modify the coded data of high quality into coded data of low quality, these facts will relieve the burdens on both the apparatuses. In this example, this temporal coding is performed using the frame predictive coding tool of sampling per single pixel (Step S24).

In this embodiment, in the coding and decoding apparatus 2b on the decoder, inverse converter 623 and inverse quantizer 624 have their respective tools C as the decoding tools requested, but frame predictive decoder 625 does not have the requested tool of sampling per ¼ pixel. For this reason, as shown in the flowchart in FIG. 27, coding and decoding apparatus 1b on the transmitting side transmits the tool information whilst sending out either the coding information of low quality which is prepared by the modified tools or the coding information of the original quality. As show in FIG. 28, coding and decoding apparatus 2b on the decoder receives coded data (Step S31). Since no requested tool is found in the decoder (Step S32), the decoding is performed by using the top-ranked tools (Step S33) although the quality becomes degraded from the requested level. At the same time, the apparatus 2b receives the tool information of the requested tool by tool information transmitter/receiver 627 (Step S34) so as to construct the tool in the tool information/downloading controller 628 (Step S35 to S37).

In this way, as soon as the requested tool becomes ready, the operation is switched from the top-ranked tool to the requested tool by means of switch 622 so that the coded data of the requested quality can be decoded thus displaying the video output by means of video output unit 621. In this example, whilst the coded data which has been coded by the frame predictive coding of sampling per ¼ pixel is decoded temporarily by means of frame predictive coding of sampling per single pixel, the tool for the frame predictive coding of sampling per ¼ pixel is downloaded, and as soon as the tool becomes prepared, the coded data will be decoded by the frame predictive coding of sampling per ¼ pixel.

As has been described above, in accordance with the fifth embodiment of the invention, when the coded data is transmitted, if the tools which barely permit the decoding of the data although the decoded data degrades, is found in the receiving side, the transmitting side transmits the requested tools constructing the algorithm as the means of decoding the coded data together with the coded data. The transmitting side temporarily transmits the coded data which is made to conform to the tools barely permitting the decoding though the decoded data degrades, whilst sending out the tool information. Further, the receiving side, whilst decoding using the tools which barely permit the decoding although the data degrades, downloads the requested tools. Moreover, after the requested tools become prepared, the receiving side decodes the coded data of the requested quality.

In conclusion, as in the next-generation image coding scheme (MPEG4 etc.), when a variety of coding and decoding tools are used in the algorithm, the coding and decoding tools which can be replaced by other tools although the quality degrades if the substitution is used, are defined as the bottom-ranked tools for the highest quality and the tools which are not replaceable are defined as the top-ranked tools. In this way, the apparatus is hierarchized so that the interchangeability is established based on the top-ranked tools and the tool information can be downloaded. In such a coding and decoding apparatus of the fifth embodiment of the invention, if the decoding apparatus on the receiving side has no tool requested by the transmitting side, the coding apparatus on the transmitting side will transmit decoding tool information and coded data simultaneously. Therefore, compared to the configuration in which only the tool information is transmitted at first, and the coded data is decoded based on the tool only after the tool information is downloaded, it becomes possible to save the time during which the tool information alone is transmitted. As a result, it is possible to quicken the start of transmission of coded data.

Since when the decoding apparatus on the receiving side has no decoding tool requested by the transmitting side, the coding apparatus on the transmitting side temporarily changes the coding scheme using the coding tool that is in conformity with the decoding tool present on the receiving side, it is possible to reduce the delay of the start of decoding although the quality temporarily degrades.

When the decoding apparatus on the receiving side has no decoding tool requested by the coding apparatus on the transmitting side, the receiving side, whilst downloading the decoding tool transmitted from the transmitting side to construct the requested decoding tool, temporarily decodes the coded data using a substitutable top-ranked tool which is lowered in quality but still is able to perform decoding. Therefore, the top-ranked tool can be used at the early stage thus making it possible to reduce the delay of the start of decoding although the quality temporarily degrades.

Moreover, since after the decoding tool requested has become prepared, the receiving side starts to decode using the requested decoding tool, the quality an be assured after the completion of the construction of the requested decoding tool.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An image data coding apparatus comprising:
   a motion compensator comprising at least two different motion compensating tools:
   a transformer;
   a quantizer comprising at least two different quantizing tools;
   an inverse quantizer comprising at least two different inverse quantizing tools; and
   an inverse transformer;
   said image data coding apparatus transmitting
   (a) information indicating a motion compensating tool for performing motion compensation and
   (b) information indicating an inverse quantizing tool for inverse quantizing the coded image data.

2. The image data coding apparatus of claim 1 wherein said motion compensator includes
   (a) a first tool for sampling per half pixel and per integer pixel and
   (b) a second tool for sampling per quarter pixel, per half pixel and per integer pixel.

3. The image data coding apparatus of claim 1 wherein said inverse quantizer includes
   (a) a first tool having a first processing capability and
   (b) a second tool having a second processing capability different than the first processing capability.

4. An image data decoding apparatus comprising:
   a motion compensator comprising at least two different motion compensating tools;
   an inverse quantizer comprising at least two different inverse quantizing tools; and
   an inverse transformer;
   said image data decoding apparatus receiving
   (a) information indicating a motion compensating tool for performing motion compensation and
   (b) information indicating an inverse quantizing tool for inverse quantizing the coded image data.

5. The image data decoding apparatus of claim 4 wherein said motion compensator includes
   (a) a first tool for sampling per half pixel and per integer pixel and
   (b) a second tool for sampling per quarter pixel, per half pixel and per integer pixel.

6. The image data decoding apparatus of claim 4 wherein said inverse quantizer includes
   (a) a first tool having a first processing capability and
   (b) a second tool having a second processing capability different than the first processing capability.

* * * * *